United States Patent
Nakamoto et al.

(10) Patent No.: US 7,403,641 B2
(45) Date of Patent: Jul. 22, 2008

(54) OBJECT RECOGNITION SYSTEM

(75) Inventors: Eiji Nakamoto, Hirakata (JP); Kenichi Hagio, Toyonaka (JP); Atsuyuki Hirono, Kobe (JP); Satoshi Furukawa, Hirakata (JP)

(73) Assignee: Matsushita Electric Works, Ltd., Osaka (JP)

( * ) Notice: Subject to any disclaimer, the term of this patent is extended or adjusted under 35 U.S.C. 154(b) by 660 days.

(21) Appl. No.: 11/068,834

(22) Filed: Mar. 2, 2005

(65) Prior Publication Data
US 2005/0265605 A1 Dec. 1, 2005

(30) Foreign Application Priority Data
May 28, 2004 (JP) .............................. 2004-160024
May 31, 2004 (JP) .............................. 2004-162351

(51) Int. Cl.
G06K 9/00 (2006.01)
(52) U.S. Cl. ....................... 382/118; 382/209; 382/154; 382/298; 382/283; 358/1.9; 358/1.18; 358/452
(58) Field of Classification Search ................ 382/118, 382/209, 154, 298, 283; 358/1.9, 1.18, 452
See application file for complete search history.

(56) References Cited
U.S. PATENT DOCUMENTS
2001/0002932 A1 6/2001 Matsuo et al.

FOREIGN PATENT DOCUMENTS
JP 09-073544 A1 3/1997

*Primary Examiner*—Matthew C. Bella
*Assistant Examiner*—Mike Rahmjoo
(74) *Attorney, Agent, or Firm*—Cheng Law Group PLLC

(57) ABSTRACT

An object recognition system utilizes a mask locator for extracting a mask area (M) from within a subject image in order to recognize the mask area (M) with a subject image. The mask locator (40) refers to density gradient directional images respectively converted from an image size template and the subject image, and analyzes these density gradient directional images particularly with respect to the density gradient directional values ($\theta T$, $\theta S$) assigned to each pixel in each directional images to obtain parameters linking the image size template to the mask area (M) to be registered with the image size template. The mask locator has a vote module (60) which gives candidates for the center of the mask by varying the parameters and votes on the candidates. Based upon the number of votes for the candidates, a detection module (70) designate one of the candidates having a maximum vote number as the center of the mask area (M), thereby determining the mask area (M) around thus designated candidate within the subject image for exact recognition of the object in the subject image.

29 Claims, 16 Drawing Sheets

FIG. 2
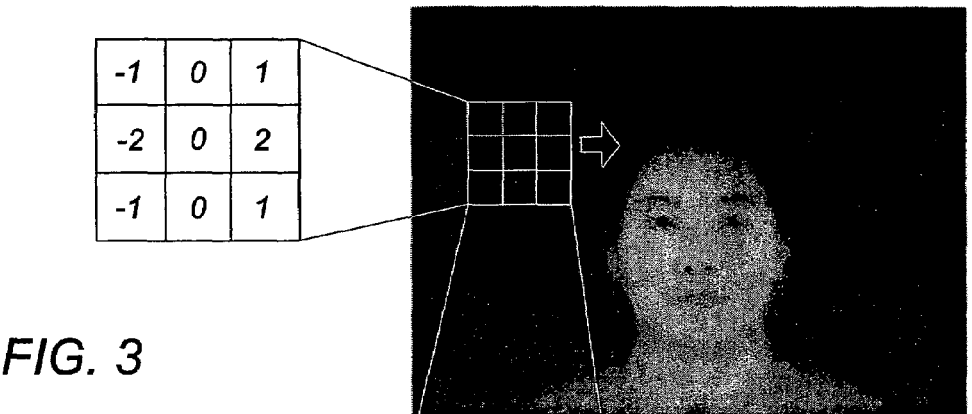
FIG. 3
FIG. 4A
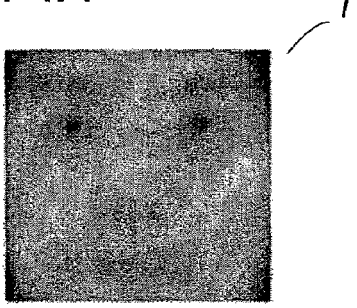
FIG. 4B
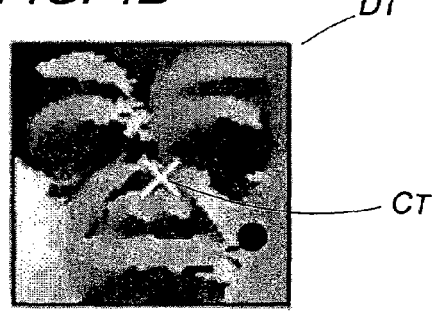
FIG. 5A
FIG. 5B
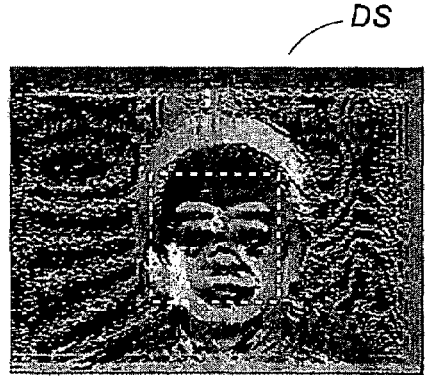

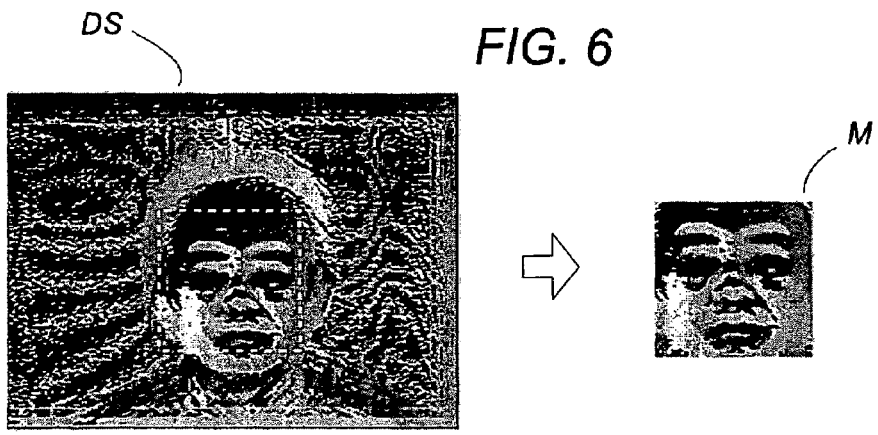
FIG. 6
FIG. 7A
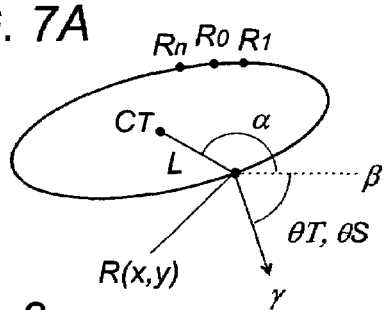
FIG. 7B
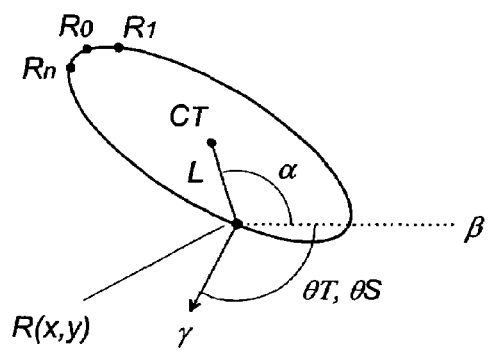
FIG. 8
| Reference Point (Rx, Ry) | θT | α | L |
|---|---|---|---|
| R0 | 10 | 260 | 10 |
| R1 | 0 | 70 | 14 |
| R2 | 0 | 50 | 2 |
| R3 | 5 | 310 | 17 |
| R8 | 15 | 125 | 6 |
| R9 | 10 | 36 | 7 |
| R10 | 15 | 96 | 22 |
| ... | ... | ... | ... |
FIG. 10
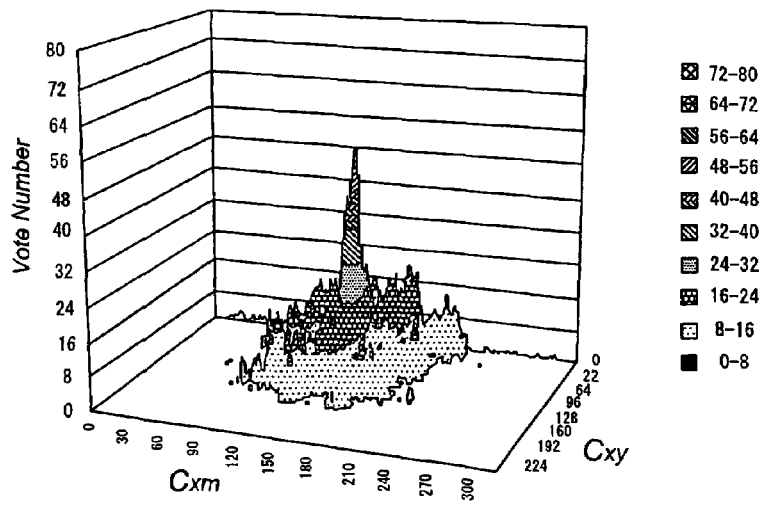

FIG. 9

Step 1

Obtain Density Gradient
Directional Value (θs)
for each pixel in
Density Gradient Directional
Subject Image [DS]

Step 2

Read from Table
Length (L), Angle (α), &
Coordinates (R0, R1, .. Rn) of
Reference Points having
the same Directional Value
(θs=θT)

| Reference Point (Rx, Ry) | θT | α | L |
|---|---|---|---|
| R0 | 10 | 260 | 10 |
| R1 | 0 | 70 | 14 |
| R2 | 0 | 50 | 2 |
| R3 | 5 | 310 | 17 |
| R8 | 15 | 125 | 6 |
| R9 | 10 | 36 | 7 |
| R10 | 15 | 96 | 22 |
| ... | ... | ... | ... |

Step 3

Vote on Candiates for
the center of Mask Area (M)
with respect to each pixel in
Subject Image [DS] using $Cxm = k \times L \times \cos(\alpha + \varphi) + Rx$ $Cxm = k \times L \times \cos(\alpha + \varphi) + Rx$

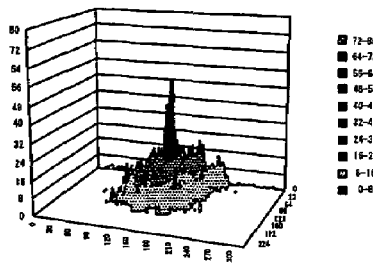

Step 4

Select Candidate
having a maximum of votes &
Designate it as the Center of
Mask Area (M)

OBJECT RECOGNITION SYSTEM

TECHNICAL FIELD

The present invention is directed to an object recognition system, and more particularly to a system effective for identifying the presence of a particular object or a human face in a subject image taken.

BACKGROUND ART

An object recognition requires to extract a particular mask area within a subject image in order to validate the mask area by comparison with an object image template. There have been proposed a scheme for extraction of the mask area, for example, as disclosed in US2001-002932 and JP09-73544.

US2001-002932 discloses a human face image extraction system which selects a suitable template in order to extract the mask area from within the subject image that matches with the template. The template is selected to include a circular, ellipse, or polygon in anticipation of that the human face has a contour analogous with such simple shape. However, with the use of such simple shape as the template, it is likely to miss the mask area and is therefore not reliable for extracting the true mask area to be validated.

JP09-73544 discloses a like system which utilizes a template of ellipse and varies parameters of the ellipse to get an optimum ellipse in best match with the mask area to be validated. This scheme necessitates selecting a temporary mask area each time the parameters are varied to give an instant ellipse, and analyzing a correlation between the temporary mask area and instant ellipse until the correlation satisfies a predetermined criterion. Therefore, the scheme requires a large number of arithmetic operations in order to obtain the optimum parameters, i.e., the optimum ellipse in best match with the mask area to be validated, and is not suitable for rapid human face recognition.

DISCLOSURE OF THE INVENTION

In view of the above insufficiencies, the present invention has been accomplished to provide an object recognition system which is capable of determining the mask area from within a subject image [S] accurately and rapidly for reliable and easy recognition. The system in accordance with the present invention includes a template memory storing an image size template [T], an image reader taking the subject image [S] to be verified, and a mask locator which locates, from within the subject image [S], the mask area [M] corresponding to the image size template. The mask locator is designed to have an image converter, a feature analyzer, a table, a vote module, and a detection module.

The image converter is configured to convert the image size template [T] as well as the subject image [S] respectively into a density gradient directional template image [DT] and a density gradient directional subject image [DS]. Each of the directional images [DT, DS] has an array of pixels each storing a density gradient directional value ($\theta T$, $\theta S$) assigned thereto.

The feature analyzer is configured to select a plurality of reference points ($R0, \ldots Rn$) around a predetermined center point ($C_T$) within the directional template image [DT] and to obtain a distance (L) and an angle ($\alpha$) for each of the reference points. The distance (L) is a length of a line extending from the center point ($C_T$) to the reference point, while the angle ($\alpha$) is an angle of that line with respect to a horizontal axis.

The table is configured to store, for each of the reference points, the distance (L) and the angle ($\alpha$) in association with the density gradient directional value ($\theta T$) given to each of the reference points ($R0, \ldots Rn$).

The vote module is configured to obtain the density gradient directional value ($\theta S$) for each pixel of the directional subject image [DS], and to read from the table, parameters composed of the distance (L), the angle ($\alpha$), and coordinates with regard to the reference points having the same density gradient directional value ($\theta T = \theta S$), so as to calculate a plurality of candidates for a center (C) of the mask area [M] based upon these parameters and make a vote on each of the candidates.

The detection module is configured to designate at least one of the candidates as the center of the mask area [M] according to the number of the votes, thereby determining the mask area [M] around thus designated candidate within the subject image.

Thus, the mask locator relies upon the density-gradient directional template image [DT] and the density-gradient directional subject image [DS], and votes for the candidates with regard to the center of the mask area [M] respectively for the pixels of the directional subject image [DS] by referring to the directional template image [DT] in terms of the directional value, and designates the candidate based upon the number of votes as representing the center of the mask area [M]. With this result, it is readily possible to determine the mask area [M] exactly for reliable recognition of the object in the subject image [S].

The system of the present invention is particularly suitable for recognition of a human face. In this instance, the image size template is selected to have a human face which constitutes a basis for determining the mask area as analogous with the human face, and therefore recognizing the presence of the human face in the subject image [S]. Preferably, the detection module is configured to obtain a maximum of the vote and designate one of the candidates having a maximum number of votes as the center of the mask area [M].

The vote module may be configured to vary the distance (L) within a predetermined range in order to calculate a plurality of the candidates for each of the varied distances, and to make a vote on each of the candidates. The distance (L) is indicative of a size of the mask area [M] relative to the image size template [t]. In this instance, the detection module is configured to extract the varied distance from the candidate having a maximum number of the votes, thereby obtaining a size of the mask area [M] relative to the image size template M. Thus, even when the subject image [S] includes a target object which differs in size from the image size template [T], the mask locator can determine the relative size of the mask area [M] to the image size template [T], thereby extracting the mask [M] in exact correspondence to the image size template [T]. When the object recognition system is utilized in association with a security camera or an object verification device, the relative size of the mask area thus obtained can be utilized to zoom on the mask area for easy confirmation of the object or the human face or to make a detailed analysis on the mask for verification of the object. Therefore, when the object verification is made in comparison with a verification image template [V], the verification image template [V] can be easily matched with the mask area [M] based upon the relative size of the mask area.

Also, in order to obtain the relative size of the mask area, the mask locator may be alternatively arranged to include a multiplier which varies a size of the image size template [T] within a predetermined range such that the vote module calculates a plurality of the candidates for each of the varied sizes and make a vote on each of the candidates.

Further, the vote module may be designed to vary the angle ($\alpha+\phi$) within a predetermined range in order to calculate a plurality of the candidates for each of the varied angles ($\alpha+\phi$), and make a vote on each of the candidates. In this instance, the detection module is designed to extract the varied angle ($\alpha+\phi$) from the candidate having a maximum number of the votes, thereby obtaining a rotation angle ($\phi$) of the mask area [M] relative to the image size template [T] for matching the angle of the template with the mask area [M]. Thus, even when the subject image [S] includes an object or human face which is inclined or rotated relative to the image size template [T], the mask locator can extract the mask area [M] in correspondence to the image size template [T], and therefore give a relative rotation angle of the mask area to the image size template [T]. The relative rotation angle thus obtained can be therefore best utilized to control the associated camera to give an upright face image for easy confirmation, or to match the verification image template [V] with the mask area [M] for reliable object or human face verification.

Alternatively, the mask locator may be designed to include a rotator which rotates the image size template by a varying angle ($\phi$) within a predetermined range such that the vote module calculates a plurality of the candidates for each of the varied angles and make a vote on each of the candidates. Whereby the detection module can extract the angle ($\phi$) from the candidate having a maximum number of the votes and obtains a rotation angle ($\phi$) of the mask area [M] relative to the image size template [T].

In a preferred embodiment, the detection module includes a selector that selects the candidates having the number of votes exceeding a predetermined vote threshold, and a mask provider that sets the mask area [M] around the center defined by each of selected candidates. Also included in the detection module is a duplication checker that obtains, if more than one mask area [M] is set and if the mask areas overlaps partially with each other, the number of votes for each of the overlapped mask areas and designate only one of the overlapped mask areas having the maximum number of votes as a representing mask area [M]. With this scheme, it is possible to extract the mask area [M] truly indicative of the object or human face to be recognized when the subject image [S] is taken to include the partially overlapped objects or human faces to be respectively extracted as the mask areas.

Further, the detection module may be designed to include a like a selector for candidates having the number of votes exceeding a predetermined vote threshold, a like mask provider setting the mask area [M] around the center defined by each of selected candidates, and a background noise filter. The background noise filter is configured to obtain a parameter indicative of the number of the votes given to each of the pixels selected around the candidate, and filter out the mask area [M] having the parameter exceeding a predetermined parameter threshold. Thus, it is readily possible to cancel the background noise for reliable verification.

Also for canceling the background noise, the background noise filter may be configured to have a standard distribution of density gradient directional values predefined for a standard object which may be the one included in the image size template. The background noise filter gives a subject distribution of the density gradient directional values obtained for the subject image [S] within the mask area (M), and analyzes the subject distribution in comparison with the standard distribution statistically in order to validate the mask area (M), and filters out the mask area (M) not validated.

The background noise filter may be alternatively configured to give a frequency distribution of the density gradient directional values with regard to the pixels in the mask area [M], obtain therefrom a variance for that mask area [M], and filter out the mask area [M] having the variance exceeding a predetermined variance threshold.

Further, the background noise filter may be configured to give a frequency distribution of the density gradient directional values with regard to the pixels in the mask area [M], obtain a maximum cyclicity for the mask area, filter out the mask area [M] having the maximum cyclicity exceeding a predetermined cyclicity threshold.

The vote module is preferred to make a preliminary voting and subsequently a master voting. The preliminary vote is made with the distance (L) varying by a rough step over a wide range, while the master vote is made with the distance (L) varying by a precise step over a restricted range relative to the preliminary voting. For this purpose, the detector module is configured to include a preliminary detector, a master detector, a curve generator, an estimator, and a template adjustor. The preliminary detector instructs the vote module to firstly make the preliminary voting, obtain a prime distance defined by the candidate having the maximum number of votes, and select two adjacent peripheral distances on opposite sides of the prime distance. The master detector instructs the vote module to make the master voting only within the restricted range between the selected peripheral distances for obtaining the number of votes for each of the distances varied by the precise step. Then, the curve generator is responsive to render an approximation curve for the number of votes given by the master voting with regard to the varied distances. The estimator gives an estimated distance corresponding to a maximum of the approximation curve. Based upon the estimated distance, the template adjustor determines a relative size of the mask area [M] to the image size template [T]. Thus, the verification image template [V] can be resized in exact match with the mask area [M] for precise and reliable verification Likewise, it is also possible to determine an exact rotation of the mask area [M] relative to the image size template [T] by making the preliminary as well as the master votes with regard to the angle ($\alpha$). In this instance, the preliminary detector instructs the vote module to firstly make the preliminary voting, obtain a prime angle defined by the candidate having the maximum number of votes, and select two adjacent peripheral angles on opposite sides of the prime angle. Thereafter, the master detector instructs the vote module to make the master voting only within the restricted range between the peripheral angles for obtaining the number of votes for each of the angles varied by the precise step. Then, the curve generator operates to render an approximation curve for the number of votes given by the master voting with regard to the varied angles so that the estimator gives an estimated angle ($\phi$) corresponding to a maximum of the approximation curve. Whereby, the template adjustor determines the rotation angle of the mask area [M] relative to the image size template [T] as the estimated angle for giving the relative rotation angle of the mask area.

Further, in order to save memory data size for rapid calculation, the image converter may be configured to compress the density-gradient directional template image [DT] and the density-gradient directional subject image [DS] respectively into correspondingly reduced images. The compression is made by integrating two or more pixels in each of the standard images into a single pixel in each of the reduced image by referring to an edge image obtained for each of the image size template [T] and the subject image [S]. The edge image gives a differentiation strength for each pixel which is relied upon to determine which one of the adjacent pixels is a representative one. The representative pixel is utilized to select the density gradient directional value ($\theta T$, $\theta S$) from each of the directional template and subject images [DT, DS] as representing of the adjacent pixels and is assigned to a single sub-pixel in each of the reduced images such that the reduce image can be reduced in size for saving a memory area.

In a preferred embodiment, the system includes a verification unit which is configured to compare the mask area [M] with the verification image template [V] in order to provide a verification result indicative of whether or not the mask area [M] is in match with the verification template image [V].

For making reliable verification, the verification unit of the system is preferred to include a directional image converter, a differentiator, a class provider, an analyzer, and a judge. The directional image converter converts the verification image template V into a corresponding density gradient directional verification template [DV] such that the directional verification template [DV] has an array of pixels each storing a density gradient directional value ($\theta V$) assigned thereto. The differentiator gives a direction difference ($d\theta = \theta s - \theta v$) of the density gradient directions between each pixel of the mask area [M] of the directional subject image [DS] and a corresponding pixel of the density gradient directional verification template [DV]. The class provider is configured to provide a predetermined number of different classes classified according to the direction difference, and to give a frequency distribution of the direction differences ($d\theta = \theta s - \theta v$). The analyzer specifies a restricted set of the classes and counts the sum of frequency values for the specified classes, and gives an evaluation parameter that is a function of the sum. The judge is configured to verify that the subject image is identical to the verification image template [V] when the evaluation parameter satisfies a predetermined criterion. Preferably, the analyzer gives the evaluation parameter which is a ratio of the sum of the frequency value to a total number of the pixels in either of the verification template or the mask area [M].

The verification unit may further include a pixel filter for more reliable verification. The pixel filter is configured to obtain an x-axis derivative (dx) as well as a y-axis derivative (dy) with regard to the density for each pixel in at least one of the verification image template [V] and the subject image [S] confined by the mask area [M]. The pixel filter specifies the pixel as a specific pixel when both of the x-axis derivative and y-axis derivative are zero for that pixel. The differentiator ignores the specific pixel in the mask area [M] of the directional subject image [DS] and the corresponding pixel in the directional verification template [DV] so as not to give the direction difference ($d\theta = \theta s - \theta v$) in relation to the specific pixel.

Still further, the verification unit may include a brightness filter which obtains a brightness value assigned to each pixel of the subject image [S] confined by the mask area [M]. The brightness filter selects each pixel as a center pixel and neighboring pixels immediately adjacent thereto, and obtains the brightness value for each of the selected pixels. The brightness filter specifies the center pixel as a specific pixel when one or more of the selected pixel has a maximum of the brightness value. Then, the differentiator ignores the pixel in the directional subject image [DS] coincident with the specific pixel as well as the corresponding pixel in the directional verification template [DV] so as not to give the direction difference ($d\theta = \theta s - \theta v$) in relation to the specific pixel. With this scheme, the portions or pixels having a saturated brightness in the subject image can be ignored for reliable image verification.

The analyzer of the verification unit may be alternatively configured to analyze the frequency distribution to give an approximation function thereof, and to extract a constant term as the evaluation parameter from the approximation function. Whereby, the judge can verify that the subject image is identical to the verification image template when the evaluation parameter satisfies a predetermined criterion.

The verification unit may further include a controller which is responsible for selecting one of sub-divisions each included in the mask area [M] to cover a distinctive part of the subject image, limiting the mask area [M] to the selected sub-division, and calling for the judge. The controller is configured to select another of the sub-divisions and limit the mask area [M] thereto until the judge decides the verification or until all of the sub-divisions are selected. Thus, by assigning the sub-divisions to particular distinctive portions of the object, for example, eyes, nose, and mouth of the human face specific to the individuals, the verification can be done when any one of the sub-divisions is verified to be identical to that of the verification image, which can certainly reduce the time for verification, yet assuring reliable verification.

Alternatively, the controller may be configured to select another of the sub-divisions and limit the mask area [M] to the another sub-division plus all the previously selected sub-division until the judge decides the verification or until all of the sub-divisions are selected. Thus, the characteristic of the sub-divisions or parts of the object can be cumulatively evaluated to give more reliable verification.

In another preferred embodiment, the verification unit is configured to include a brightness unbalance checker, a full-area analyzer, a restricted-are analyzer, a controller, and a judge. The brightness unbalance checker is configured to divide the mask area [M] into two symmetrical sub-regions and obtain a brightness index indicative of a mean value or a variance with regard to the density for all the pixels in each of the sub-divisions. The checker gives an unbalancing degree which is a function of the two brightness indexes and becomes less as the two brightness indexes are closer to each other. The full-area analyzer is configured to compare the entire mask area [M] with the verification image template [V] so as to give a first correlation coefficient, thereby providing a full-verification-confirmed signal when the first correlation coefficient exceeds a predetermined first correlation threshold and otherwise providing a full-verification-failed signal. The restricted-area analyzer is configured to compare at least one of the sub-regions with a corresponding part of the verification image template so as to give a second correlation coefficient. The restricted-area analyzer provides a restricted-verification-confirmed signal when the second correlation coefficient exceeds a predetermined second correlation threshold and otherwise providing a restricted-verification-failed signal. The controller is configured to activate the full-area analyzer and activate the brightness unbalance checker only upon recognition of the full-verification-failed signal. When the unbalancing degree exceeds a predetermined unbalance threshold, the controller responds to activate the restricted-area analyzer. Based upon the above analysis, the judge provides:

1) a first result that the subject image is verified upon recognition of the full-verification-confirmed signal;
2) a second result that the subject image is not verified upon recognition of the full-verification-failed signal;
3) a third result that the subject image is verified upon recognition of the restricted-verification-confirmed signal; and
4) a fourth result that the subject image is not verified upon recognition of the restricted-verification-failed signal.

Thus, the system can take care of possible unbalanced brightness in the subject image [S] to give a consistent verification with a combination of the full-area analysis and the restricted-area analysis.

Alternatively, the controller may be configured to activate the brightness unbalance checker, and activate the full-area analyzer when the unbalancing degree is less than a predetermined unbalance threshold and otherwise activate the restricted-area analyzer such that the judge provides:
1) a first result that the subject image is verified upon recognition of the full-verification-confirmed signal;
2) a second result that the subject image is not verified upon recognition of the full-verification-failed signal;
3) a third result that the subject image is verified upon recognition of the restricted-verification-confirmed signal; and
4) a fourth result that the subject image is not verified upon recognition of the restricted-verification-failed signal.

In either of the above two control schemes, the associated restricted-area analyzer may be configured to select a plurality of the sub-regions within the mask area [M], and compare each sub-region with a corresponding part of the verification image template to give the second correlation coefficient for the each sub-region. The restricted-area analyzer further defines each sub-region as an authentic sub-region when the second correlation coefficient exceeds the second correlation threshold, providing the restricted-verification-confirmed signal when a ratio of the number of the authentic sub-region to that of the all sub-regions exceeds a predetermined threshold.

Preferably, the second correlation threshold of the restricted-area analyzer is set to be lower than the first correlation threshold of the full-area analyzer.

Further, the restricted-area analyzer may be disabled when the unbalancing degree exceeds a critical level.

Also in either of the above two control schemes using the full-area analyzer and the restricted area analyzer, the associated judge is preferred to output an unbalancing result including at least one of the unbalancing degree and whether or not the unbalancing degree is less than the unbalance threshold, giving more detailed information as to the verification result.

These and still other advantageous features of the present invention will become more apparent from the following description of the preferred embodiments when taken in conjunction with the attached drawings.

BRIEF DESCRIPTION OF THE DRAWINGS

FIGS. 2 and 3 illustrate the Sobel filter utilized to give density gradient directional image, respectively;

FIGS. 4A and 4B illustrate an image size template [T] and a corresponding density gradient directional template image [DT], respectively;

FIGS. 5A and 5B illustrate a subject image [S] and a corresponding density gradient directional subject image [DS], respectively;

FIG. 6 illustrates a mask area [M] extracted from within the directional subject image [DS] for comparison with a verification template [V];

FIGS. 7A and 7B illustrate definition of parameters given to the directional images for determination of the mask area [M];

FIG. 8 illustrates a format of a table storing the parameters given to the directional template image [DT];

FIG. 9 is a flow chart illustrating an operation of a mask locator utilized in the system;

FIG. 10 is a graph illustrating a vote space;

BEST MODE FOR CARRYING OUT THE INVENTION

Figure 1:
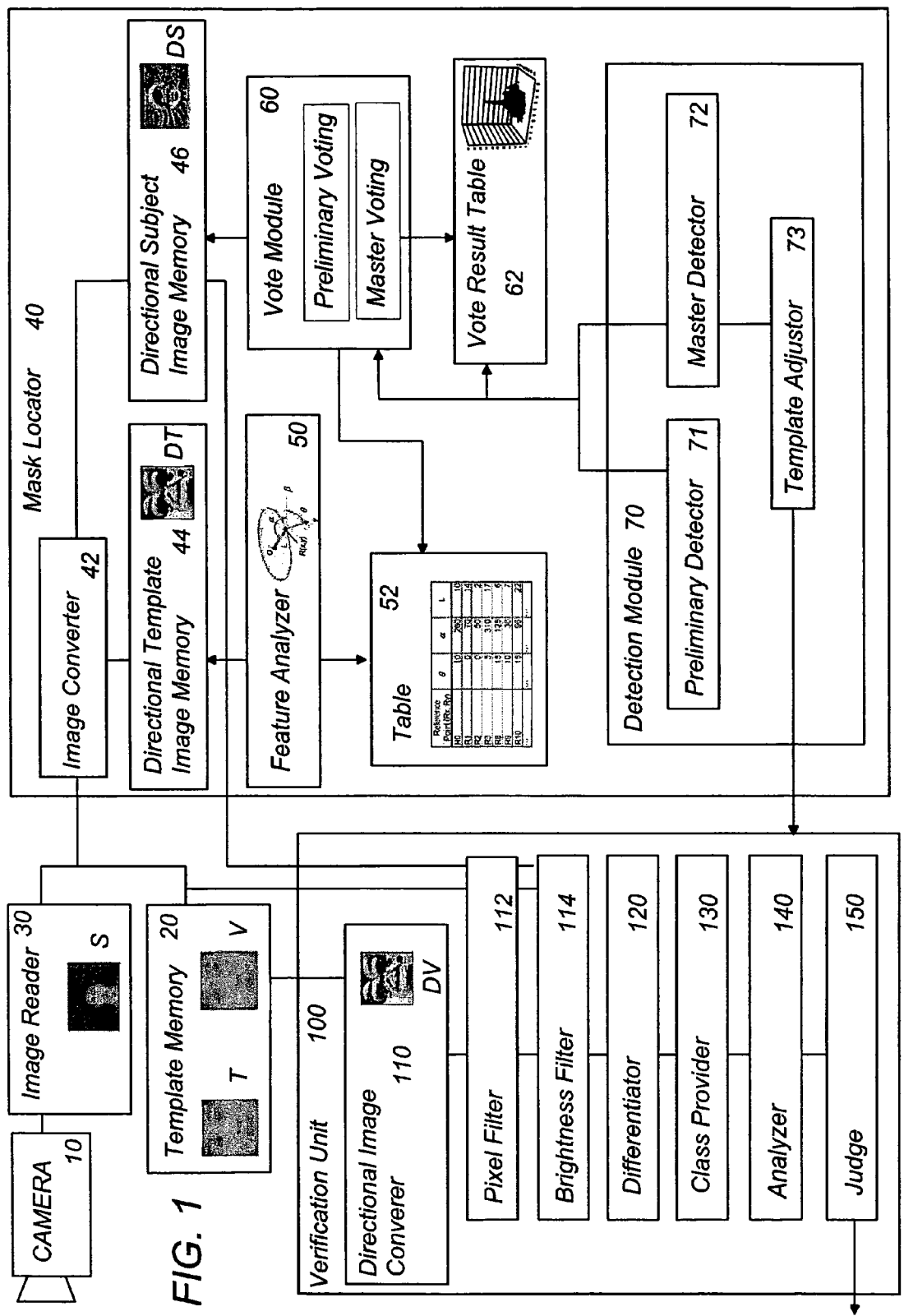
FIG. 1 is a block diagram illustrating an object recognition system in accordance with a preferred embodiment of the present invention.

Referring now to FIG. 1, there is shown a human face recognition system in accordance with a first embodiment of the present invention. Although the illustrated embodiment discloses the system utilized for human face verification as one typical application, the present system is not limited thereto and can be equally utilized in combination with a security camera or the like camera for controlling the camera to zoom on the human face and/or make an angular adjustment, realizing easy confirmation of the human face in the subject image. In this sense, the system may be also incorporated in an image processing system which is designed to correct the human face image for easy and reliable identification of the human face. Further, it should be noted that the present invention should not be limited to the human face recognition, and could be equally utilized for recognition of any other object having peculiar image properties, for example, assembly parts running in a factory assembly line or vehicles in a traffic scene.

The system includes a camera 10 for taking a picture image of a human face to be verified, an image reader 30 reading the picture image from the camera 10 to give a subject image [S] to be verified, and a template memory 20 for storing an image size template [T] as well as a verification template [V] both of which are taken as picture images. Also included in the system are a mask locator 40, and a verification unit 100. The mask locator 40 extracts, from within the subject image [S], a mask area [M] in match with the image size template [T], while the verification unit 100 compares the mask area [M] of the subject image [S] with the verification template [V] to verify whether or not the face included in the subject image [S] is identical to that given by the verification template [V].

The mask locator 40 includes an image converter 42 which converts the image size template [T] and the subject image [S] respectively into a density gradient directional template image [DT] and a density gradient directional subject image [DS] each having an array of pixels each storing a density gradient directional value ($\theta$T, $\theta$S). The conversion is made by use of the known 3×3 Sobel filter (shown in FIG. 2) to obtain x-axis derivative (dx) and y-axis derivative (dy) for each pixel, and then calculate the density gradient directional value ($\theta$T, $\theta$S) using the following equations (1), (2), and (3)

$$dx=(c+2f+i)-(a+2d+g) \quad (1)$$

$$dy=(g+2h+i)-(a+2b+c) \quad (2)$$

$$\theta T, \theta S=\tan^{-1}(dy/dx) \quad (3)$$

where a, b, c, d, e, f, g, h, and i represent individual densities given to 9 (nine) pixels in 3×3 array of a format as shown in FIG. 3.

FIGS. 4A and 4B show respectively the image size template [T] and the corresponding density gradient directional template image (herein after referred to simply as directional template image) [DT], while FIGS. 5A and 5B show respectively the subject image [S] and its density gradient directional subject image (hereinafter referred to simply as directional subject image) [DS].

It is these directional images [DT, DS] that are relied upon to determine the mask area [M] as containing characteristics of the subject image. The mask area [M] thus extracted from the directional subject image [DS], as shown in FIG. 6 is then compared with that of the verification template [V] at the verification unit 100, the details of which will be discussed in later.

Turning back to FIG. 1, the mask locator 40 includes, in addition to a directional template image memory 44 and a subject image memory 46 respectively for storing the images [DT, DS], a feature analyzer 50 which is configured to obtain parameters characteristic to the directional template image [DT], i.e., the image size template [T]. First, as shown in FIGS. 7A and 7B, it is made to select a plurality of reference points or pixels (R0, . . . Rn) around the center point CT, which is a geometrical center of the directional template image [DT] and to obtain the parameters for each of the reference points. The parameters include density gradient directional value ($\theta$T), a distance (L) of a line extending from the center point (CT) to each reference point, an angle ($\alpha$) of the line relative to a horizontal axis ($\beta$) passing through the reference point, and coordinates R(x,y). The parameters are then stored in a table 52 in a format as shown in FIG. 8.

The mask locator 40 also includes a vote module 60 which is configured to seek the mask area [M] within the directional subject image [DS]. First, it is made to obtain the density gradient directional value ($\theta$S) for each pixel in the directional subject image [DS] <step 1 of FIG. 9>, and then refer to the table 52 for reading the parameters of the distance (L), the angle ($\alpha$), and the coordinates R(x,y) given to the pixel the directional template image [DT] that has the same directional value ($\theta$S=$\theta$T) <step 2 of FIG. 9>. Then, the vote module 60 relies upon the following equations (4) and (5) to calculate candidates C(xm, ym) for the center of the mask area [M] with respect to each pixel in the directional subject image [DS], and votes on the candidates, i.e., thus calculated provisional centers for the mask area [M] <step 3 of FIG. 9>

$$Cxm=k \times L \times \cos(\alpha+\phi)+Rx \quad (4)$$

$$Cym=k \times L \times \sin(\alpha+\phi)+Ry \quad (5)$$

where (k) is a variable for a magnification, and ($\phi$) is a variable for a rotation angle.

Magnification (k) is given for a ratio of the mask area [M] relative to the size of the directional template image [DT], while rotation angle ($\phi$) is a rotation of the mask area [M] relative to the directional template image [DT]. These variables are controlled to vary respectively within predetermined ranges, as will be discussed later in details.

For easy understanding of the function of the vote module 60, it is discussed here to explain a basic function of determining the true center of the mask area [M], assuming that the subject image [S] is taken to include the object, i.e., the mask area [M] which is of the same size as the image size template [T], and which is angularly aligned with the image size template. In this instance, the above equations will be therefore devoid of variables (k) and ($\phi$), and the voting is made by use of the simplified ones of the above equations (4) and (5) to plot a plurality of candidates C(xm, ym) in a vote space as shown in FIG. 10, giving a corresponding vote result table 62 in which each candidates are associated with the number of votes given thereto.

A detection module 70 included in the mask locator 40 to analyze the number of the votes referring to the vote result table 62, i.e., the vote space of FIG. 10 in order to designate the candidate as the true center of the mask area [M] in accordance with a predetermined criterion, thereby locating or extracting the mask area [M] from within the directional subject image [DS] for verification with the verification template [V] <step 4 of FIG. 9>. Most simply, the candidate having the maximum vote is designated as indicative of the center of the mask area [M].

Now, detailed functions of the mask locator 40 are explained herein with the use of the variables (k) and ($\phi$) for determination of the mask area [M] in compensation for that the subject image is taken to include the object or mask area [M] which is possibly different by some extent in size from and rotated relative to the image size template [T]. For this purpose, magnification (k) and rotation angle ($\phi$) are controlled to vary within predetermined ranges by predetermined steps, respectively. Further, the mask locator 40 is contemplated to extract the mask area [M] accurately and rapidly through a preliminary voting followed by a master voting. The detection module 70 includes a preliminary detector 71 and a master detector 72 which instruct the vote module 60 for making the preliminary voting and the master voting, respectively. The preliminary vote is made to vary the variables over a wide range by a rough step, while the master vote is made to vary the variables over a restricted range by a precise step. For example, the preliminary voting sets the wide range of 0.6 to 1.2 within which the magnification (k) varies by the rough step of 0.2, and sets the wide range of −20° to +20° within which rotation angle ($\phi$) varies by the rough step of 10°. In the master voting, the individual restricted ranges are set, depending upon the results of the preliminary voting, to be narrower ranges in which the magnification (k) varies by the precise step of 0.1 and rotation angle ($\phi$) varies by the precise step of 5°, respectively.

Figure 11:
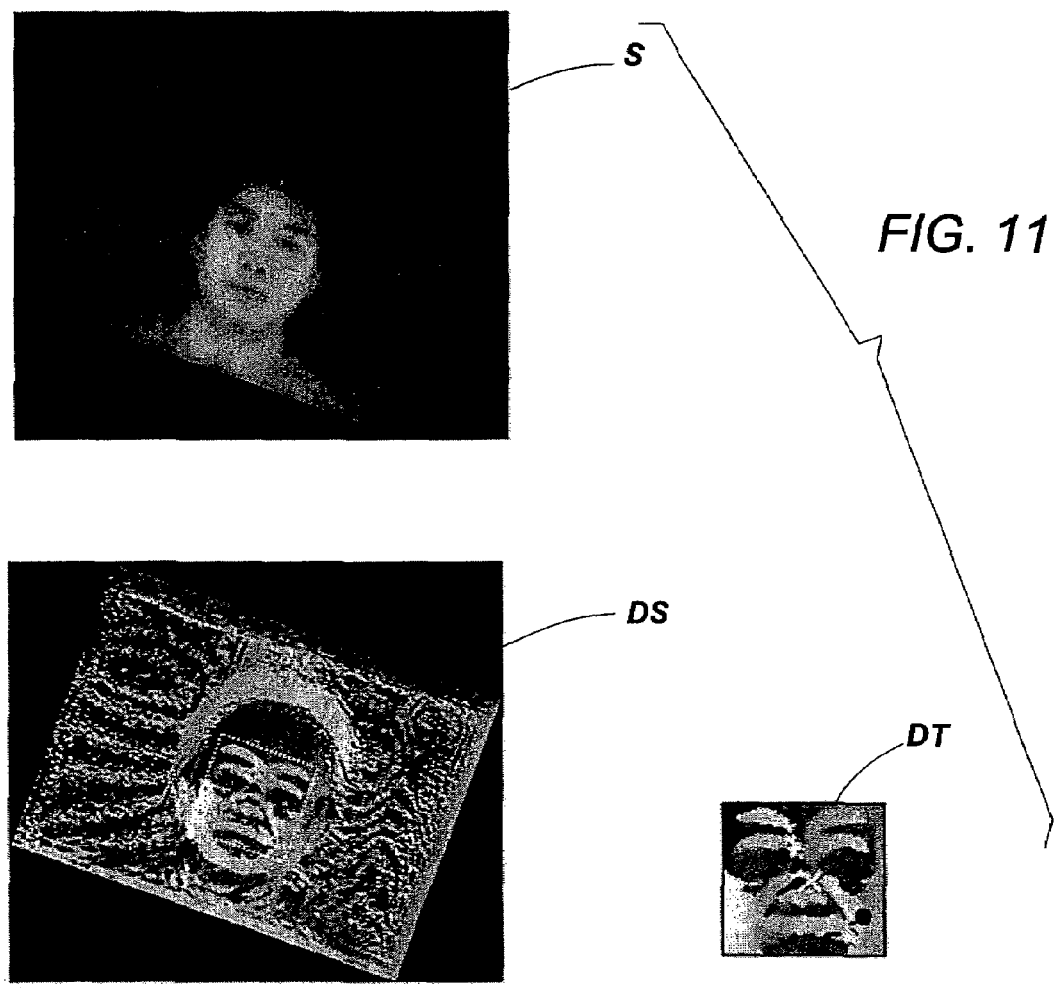
FIG. 11 illustrates the subject image [S] and its directional subject image [DS] which is smaller than and inclined relative to the directional template image [DT], and from which the mask area [M] is extracted.

Thus, the preliminary voting is made by varying the magnification (k) from 0.6 to 1.2 by 0.2 while varying the rotation angle ($\phi$) from −20° to +20° by 10° for each magnification (k). In this instance, therefore, the above equations (4) and (5) are repeated by varying (k) and ($\phi$) to vote on the candidates C(xm, ym) for each combination of (k) and ($\phi$), after which (k) and ($\phi$) associated with a maximum number of votes are selected. For example, when the directional subject image [DS] include the object which is roughly 0.9 times in size the directional template image [DT], and is tilted roughly by +10° relative to the template image [DT], as shown in FIG. 11, the preliminary voting selects a maximum number of votes for combination of k(max)=0.9 and $\phi$(max)=+10°. Taking this results, the vote module 60 sets a lower limit and an upper limit of the restricted range for (k) respectively as k(max) minus the rough step of 0.2 [k(low)=k(max)−0.2] and k(max) plus the rough step of 0.2 [k(up)=k(max)+0.2], and likewise the set a lower limit $\phi$(low)=$\phi$(max)−10° and an upper limit $\phi$(up)=$\phi$(max)+10° for the rotation angle ($\phi$). Then, the master voting is made by varying magnification (k) within the restricted range by the precise step of 0.1 and by varying ($\phi$) within the restricted range by the precise step of 5°, in order to vote on the candidates for each combination of (k) and ($\phi$). Based upon the result of the master voting, the detection module 70 finds the combination of (k) and ($\phi$) having the maximum vote, and designates the corresponding candidate C(xm, ym) as the center of the mask area [M], and at the same time derives the magnification (k) and rotation angle ($\phi$) for that combination as determining the magnification and rotation angle of the mask area [M] in relation to the image size template [T] or its directional template image [DT]. Thus, the mask area [M] is determined precisely with regard to the size and the rotation angle relative to the template, in addition to its center within the directional subject image [DS]. With this information, the detection module 70 operates to enlarge or reduce the size and/or rotate the verification image template [V] by referring to thus determined magnification (k) and the rotation angle ($\phi$), for exact registration of the mask area [M] with the verification image template [V]. For this purpose, the mask locator 40 includes a template adjustor 73 which provide relevant parameters by which the verification unit 100 resizes and/or rotate the verification image template [V] in match with the mask area [M] for verifying the subject image [S] confined by the mask area [M] in comparison with the verification image template [V]. The verification unit 100 is given data defining a relation between the image size template [T] and the verification image template [V] with regard to the size and the rotation angle, such that the verification unit 100 can resize and/or rotate the verification image template in match with the mask area for exact comparison therebetween.

Figure 12:
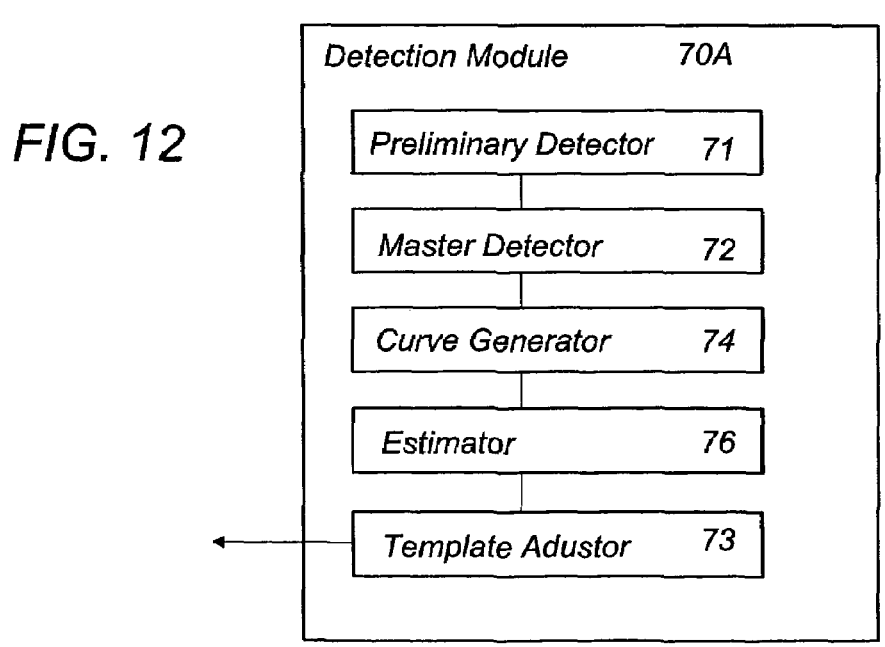
FIG. 12 illustrates a structure of another detection module utilized in the above system.
Figure 13A:
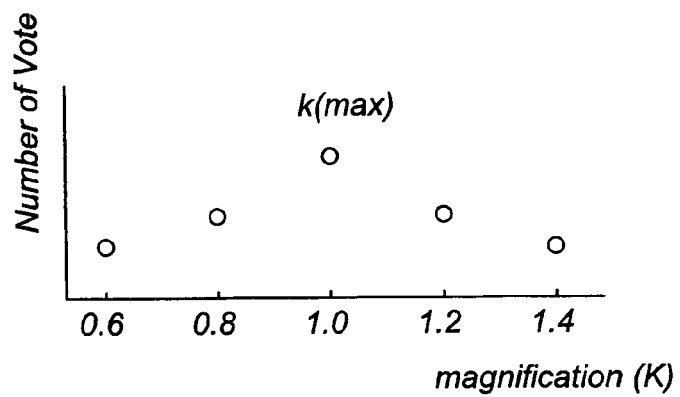
FIGS. 13A and 13B are graphs illustrating the number of votes obtained in a preliminary voting and in a master voting by varying a magnitude k or ratio of the mask area [M] relative to the template image [DT]
Figure 13B:
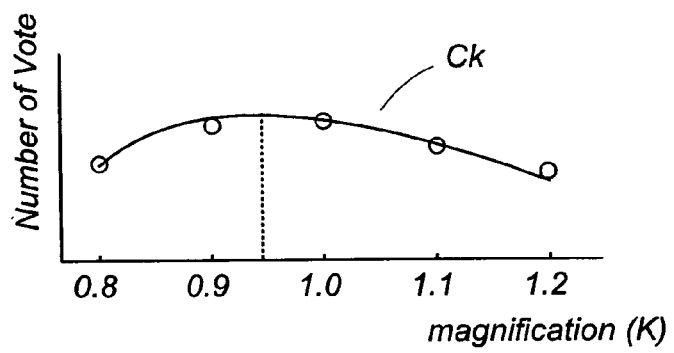
Figure 14A:
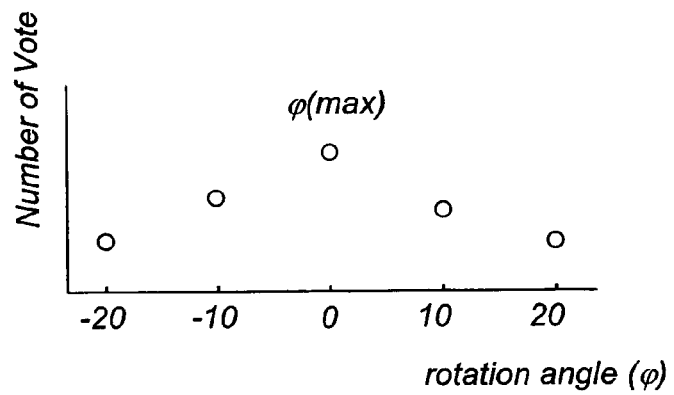
FIGS. 14A and 14B are graphs illustrating the number of votes obtained in the preliminary voting and in the master voting by varying a rotation angle φ of the mask area [M] relative to the template image [DT]
Figure 14B:
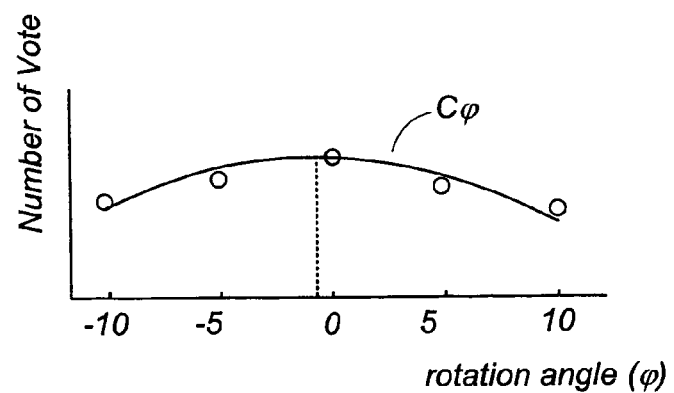

As shown in FIG. 12, the detection module 70A may be configured to additionally include a curve generator 74 and an estimator 76 for obtaining more accurate size and rotation of the mask area [M] relative to the directional template image [DT]. In this instance, the preliminary detector 71 is configured to instruct the vote module 60 to firstly make the preliminary voting as explained in the above, and to obtain a prime distance (L), i.e., magnification k(max) as well as a prime rotation angle $\phi$(max) having a maximum number of votes. Then, the preliminary detector 71 selects two adjacent peripheral distances, i.e., the peripheral values for the magnification on opposite of the prime magnification k(max), and selects tow adjacent peripheral angles on opposite of the prime rotation angle $\phi$(max). For example, when the prime magnification k(max)=1.0 is selected as having a maximum number of votes, as shown in FIG. 13A, the peripheral values for the magnification k is selected to as 0.8 and 1.2. Likewise, when the prime rotation angle $\phi$(max)=0° is selected as having a maximum number of votes, as shown in FIG. 14A, the peripheral values for the rotation angle $\phi$ is selected to be −10° and +10°. Then, the master detector 72 instructs the vote module 60 to make the master voting only within the restricted range between the peripheral values for magnification (k) and rotation angle ($\phi$) respectively with the precise step of 0.1 and 5°, giving the vote results of FIGS. 13B and 14B. Based upon the vote results, the curve generator 74 renders an approximation curve Ck, C$\phi$ for the number of votes with respect to each of the magnification (k) and rotation angle ($\phi$), as show in FIGS. 13B and 14B. The estimator 76 analyzes the curves to give an estimated magnification (k) as well as an estimated angle ($\phi$) respectively corresponding to the maximum of the curves Ck and C$\phi$, as indicated by dotted lines in FIGS. 13B and 14B, thereby obtaining more accurate size and the rotation angle of the mask area [M] relative to the directional template image [DT], i.e., the image size template [T]. One example for the approximation curves can be expressed by the general quadratic equation, $$y = a \times x^2 + b \times x + c$$

from which the maximum is obtained as $$= \frac{-b}{2 \times a}.$$

Although the voting is explained in the above to be made by varying both of the magnification (k) as well as the rotation angle (φ), either one of which may be suffice when the subject image [S] is selected to have the object or the mask area [M] of which size is identical to the image size template [T] or which is angularly aligned with the image size template.

Further, image size template [T] or its directional template image [DT] may be varied in size and angle such that the mask locator 40 could be devoid of varying magnification and/or rotation angle during the voting, and be accordingly configured to vote each time the directional image is varied in the size and the rotation angle. In this instance, the mask locator 40 is configured to include a multiplier (not shown) for varying the size of the directional template image [DT] within a predetermined range, and a rotator (not shown) for varying the rotation angle of the directional template image [DT] within a predetermined range. Then, the feature analyzer 50 derives the necessary parameters, i.e., the distance (L), angle (α), the directional value (θT) to make a table 52 for each of the varying directional template images [DT] such that the detection module 70 finds the size and the rotation angle to each of which the maximum number of vote is given, thereby selecting one of the varying directional template images [DT] to be in match with the mask area [M].

Figure 15:
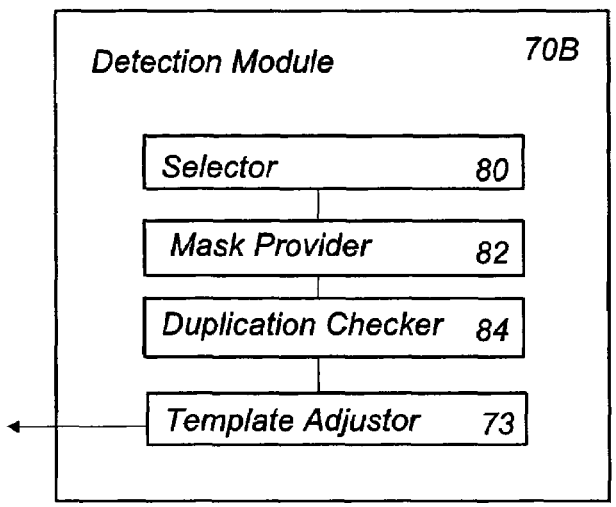
FIG. 15 illustrates a further modification of the detection module.
Figure 16:
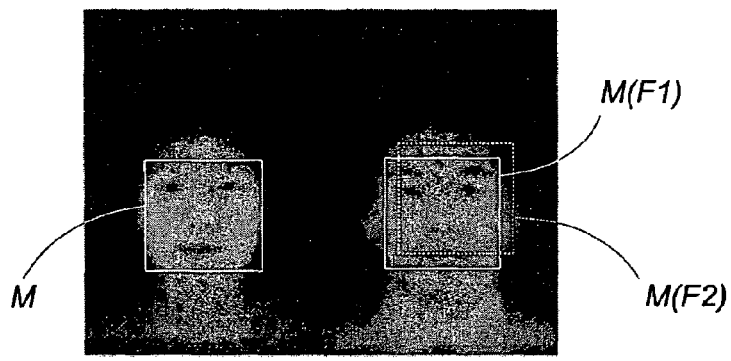
FIG. 16 illustrates one example the subject image to be verified.
Figure 17:
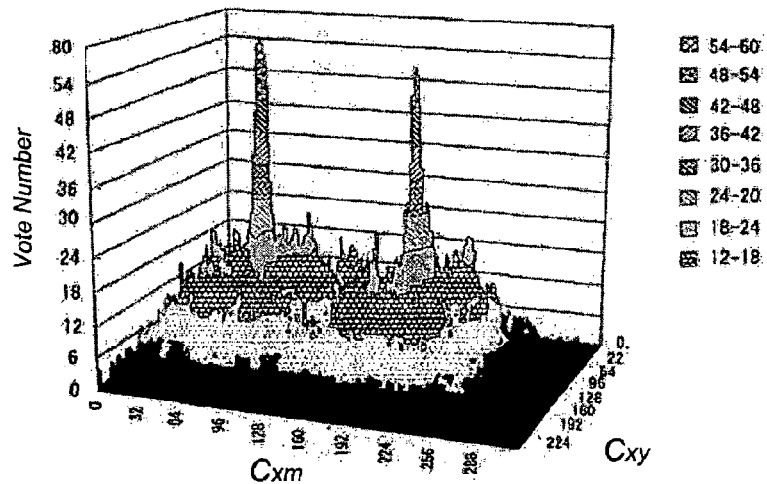
FIG. 17 illustrates a vote result for determination of the mask area [M]s within the subject image of FIG. 16.

The detection module may be configured to extract more than one mask area [M], yet excluding one of a plurality of mask areas [M] which are partially overlapped with each other. For example, when the subject image [S] includes two human faces each to be verified, as shown in FIG. 16, the detection module 70B may be configured to extract two mask areas [M] respectively for the two faces. For this purpose, the detection module 70B includes a selector 80 and a mask provider 82, as shown in FIG. 15. The selector 80 refers to the vote result of FIG. 17 and selects candidates C(xm, ym) having the number of votes exceeding a predetermined vote threshold as designating the centers of the individual mask areas [M]. The mask provider 82 is responsible for depicting the mask areas [M] around the individual centers determined by the selected candidates, in combination with magnification (k) and rotation angle (φ) associated with each of the selected candidates. Based upon the size and rotation angle for each of thus obtained mask areas [M], the template adjustor 73 gives the mask areas [M] in match with the directional template image [DT] for verification at the verification unit 100. Further included in the detection module 70B is a duplication checker 84 which operates to cancel the mask area if it partially overlaps with another mask area and is judged to be of minor importance. For example, when another mask area [M (F2)] as indicated by dotted lines in FIG. 16 is selected at the selector 74 to partially overlap the adjacent mask area [M (F1)], the duplication checker 78 is active to obtain the number of votes for each of the overlapped mask areas [M(F1)] and [M(F2)], and finally designates only one of the mask areas having the maximum number of votes as a representing mask area to be verified. Therefore, if the mask area [M(F2)] is determined by the candidate having the number of votes smaller than that of the candidate determining the mask area [M(F1)], the duplication checker 84 judges that the mask area [M(F2)] is of minor importance and not truly indicative of the face to be verified, thereby neglecting the mask area [M(F2)]. Duplication of the mask areas can be easily acknowledged at the duplication checker 84 by comparing the coordinates of the pixels included in the individual mask areas.

Figure 18:
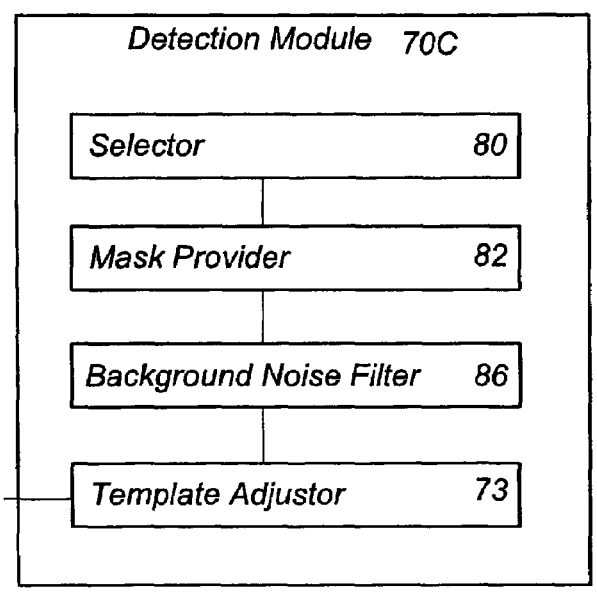
FIG. 18 illustrates a further modification of the detection module.
Figure 19:
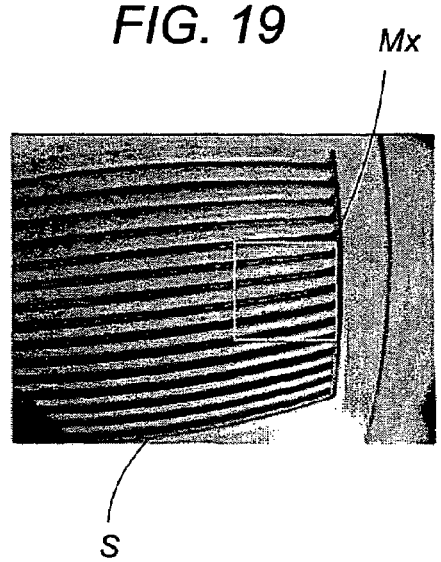
FIG. 19 illustrates the subject image [S] including a background noise.
Figure 20:
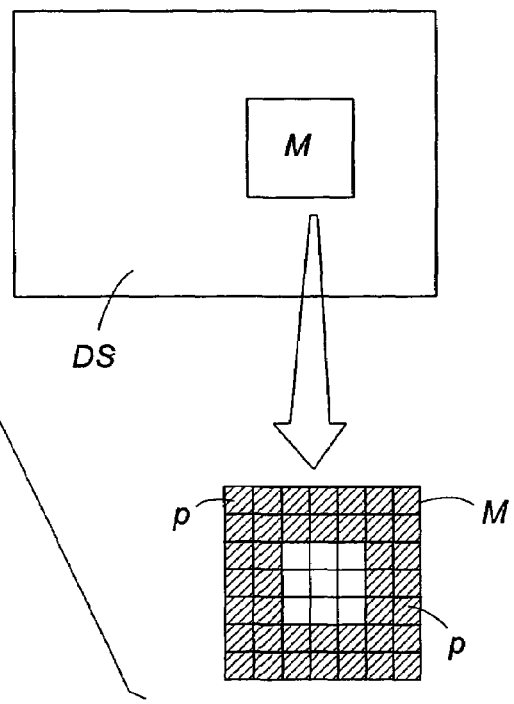
FIG. 20 illustrates a scheme of canceling the background noise.

Further, as shown in FIG. 18, a detection module 70C of different structure may be utilized in the mask locator 40 in order to filter out a background noise possibly included in the subject image [S] and therefore in its directional subject image [DS]. The detection module 70C includes, in addition to the selector 80 and the mask provider 82, a background noise filter 86 which cancels background noises included in the subject image [S]. As shown in FIG. 19, when the subject image [S] includes an area [Mx] of a monotonous pattern, the area may be acknowledged as the mask area [M] in the corresponding directional subject image [DS]. That is, because of that the selector 80 selects the candidate having the number of votes exceeding the predetermined vote threshold, there remains a possibility that the mask provider 82 determines a false mask area [M] in the directional subject image [DS], as shown in FIG. 20. In order to cancel the false mask area [M], the detection module 70C includes a background noise filter 86 which is configured to obtain a parameter indicative of the number of votes given to each of the pixels around the candidate for the mask area [M], and filter out the mask area having the parameter exceeding a predetermined vote threshold. In this instance, the filter 86 picks up the peripheral pixels [p] other than nine (9) center pixels, as shown in FIG. 20, and calculates an average of the number of votes given to the individual peripheral pixels. When the average exceeds the predetermined vote threshold, the filter 86 judges that the mask area [M] is false and cancels the mask area. The judgment is based upon the fact that the vote will be concentrated to the center of the mask area [M] when the mask area includes the human face, while the vote will be rather dispersed in the mask area [M] when the mask area include a monotonous pattern in the subject image S as shown in FIG. 19.

Figure 21:
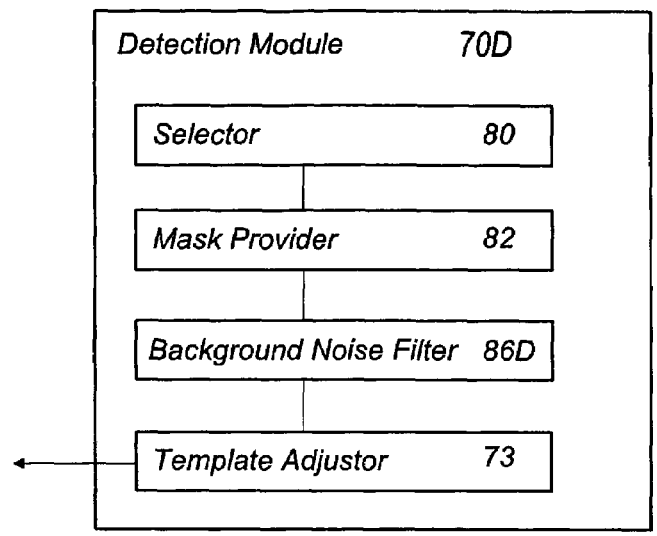
FIG. 21 illustrates a still further modification of the detection module.

FIG. 21 shows a further modification of the detection module 70D also configured to cancel the background noise in a different manner from the above detection module 70C. The detection module 70D is identical to the detection module 70C except for the function of the background noise filter 86D. The filter 86D is configured to give a frequency distribution of the density gradient directional values with regard to the pixels in the mask area [M] given by the mask provider 82. The frequency distribution can be represented in a histogram of FIG. 22B in which the directional values are classified into eight (8) classes D0 to D7 each covering 45°. Then, the filter 86D obtains a variance (Va) form the frequency distribution for the mask in accordance with the following equation (6), $$Va = \frac{1}{n-1} \sum_{i=0}^{n} (x_i - \bar{x})^2 \qquad (6)$$

in which i=0 to 7, and $x_i$ denotes frequency for the class, and $\bar{x}$ is an average of the frequency.

Figure 22A:
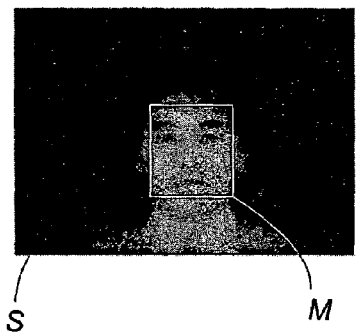
FIG. 22A illustrates the subject image [S] including the human face.
Figure 22B:
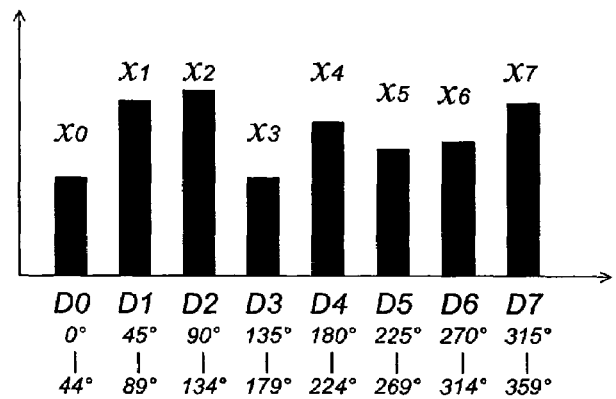
FIG. 22B illustrates a frequency distribution histogram obtained for the subject image of FIG. 22A.
Figure 23A:
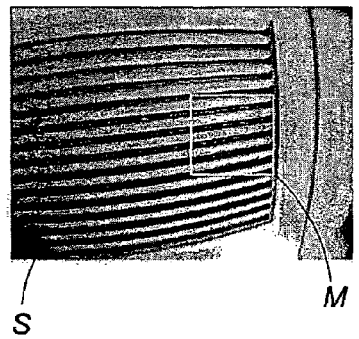
FIG. 23A illustrates the subject image [S] including an area of monotonous pattern to be determined as a false mask.
Figure 23B:
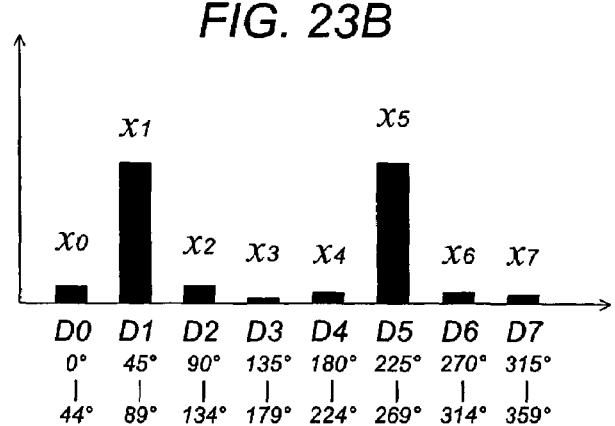
FIG. 23B illustrates a frequency distribution histogram obtained for the subject image of FIG. 23A.

When the variance (Va) exceeds a predetermined variance threshold, the filter 86D judges that the mask area [M] is a false and cancels that mask area. When the subject image [S] includes a human face as shown in FIG. 22A, the resulting frequency distribution will be one shown by the histogram of FIG. 22B with the variance (Va) of 0.0012, for example. While on the other hand, when the subject image [S] includes an area to be finally regarded as a false mask, as shown in FIG. 23A, the resulting frequency distribution will be one shown in FIG. 23B with the variance (Va) of 0.042, for example. The judgment is based upon the fact that the human face will give the density gradient directional values which are rather evenly distributed throughout the classes, while the monotonous pattern shown in FIG. 23A will give the density gradient values which are concentrated to a particular class or classes. Thus, the mask area [M] can be determined only to the he human face for reliable verification thereof by suitably selecting the variance threshold.

Instead of analyzing the variance (Va) with regard to the frequency distribution of the density gradient directional values given to the mask area [M], the background noise filter may be configured to analyze a maximum cyclicity (C) with regard to the frequency distribution for determination of the false mask area. In this instance, the cyclicity is obtained by adapting following equations (7) & (8) to the frequency distribution as shown for example in FIG. 22B or 23B, in order to obtain the maximum cyclicity (C) of equation (9):

$$cy_0 = |(x_0 + x_4) - (x_2 + x_6)| \quad (7)$$

$$cy_1 = |(x_1 + x_5) - (x_3 + x_7)| \quad (8)$$

$$C = \max(cy_0, cy_1) \quad (9)$$

When the maximum cyclicity (C) exceeds a predetermined cyclicity threshold, the background noise filter judges that the mask area [M] is false and cancels the mask area. For instance, the frequency distribution for the subject image of FIG. 22A gives the maximum cyclicity of 0.062, while that of the subject image of FIG. 23A gives a considerably greater value of 0.898 for the maximum cyclicity. Thus, by suitably selecting the cyclicity threshold, the false mask can be rejected for reliable verification.

Figure 24:
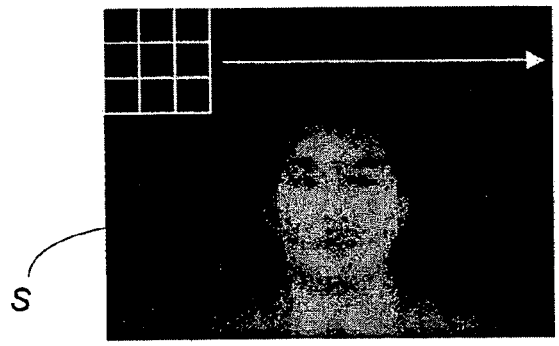
FIG. 24 illustrates the subject image [S] to be verified.

Turning back to FIG. 1, the image converter 42 may be configured to compress the directional template image [DT] and the directional subject image [DS] respectively into a reduced directional template image and reduced directional subject image which are stored in the memories 44 and 46 to be processed by the feature analyzer 50 and the vote module 60. In this instance, as shown in FIGS. 26 and 27, each of the reduced images has the number of pixels, one-fourth of that in the directional template image [DT] and the directional subject image [DS] (hereinafter simply referred to as standard image in this section) such that each unit zone [U] composed of four (4) pixels in the standard image is integrated into a single sub pixel [P] in the reduced image. The image converter 42 includes a compression module which obtains the x-axis derivative (dx) as well as the y-axis derivative (dy) with regard to the density for each pixel in each of the image size template [T] and the subject image [S] (FIG. 24) by use of the equations (1) and (2) as discussed in the above, and further obtains a differentiation strength (dxy) determined by the following equation (10), thereby giving an edge image [E], as shown in FIG. 25, which has an array of pixels each assigned to the differentiation strength (dxy).

$$dxy = \frac{(dx + dy)}{2} \quad (10)$$

Then, the compression module selects every group [G] of four pixels within the edge image [E] as corresponding to the unit zone [U] in order to find which one of the pixels has a maximum of the differentiation strength, and designate that pixel as a representing pixel. Subsequently, the standard image [DT, DS] is referred to select therefrom the density gradient directional value ($\theta T$, $\theta S$) given to the pixel corresponding to the representing pixel, whereby allocating thus selected directional value to each single sub-pixel [P] in the reduced image [Ds] of FIG. 27.

Figure 25:
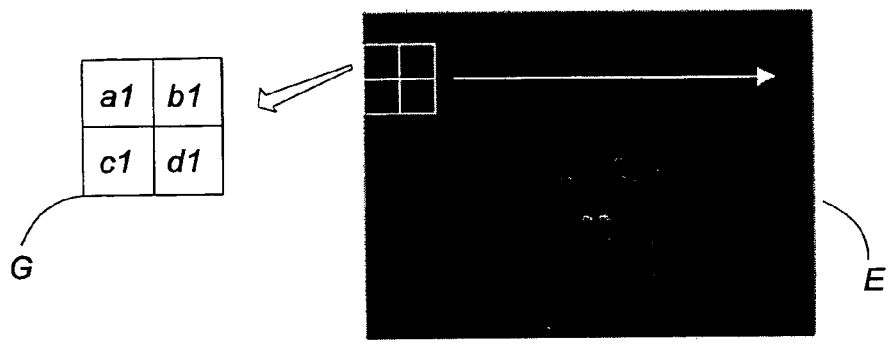
FIG. 25 illustrates an edge image [E] derived from the subject image [S] of FIG. 24.
Figure 26:
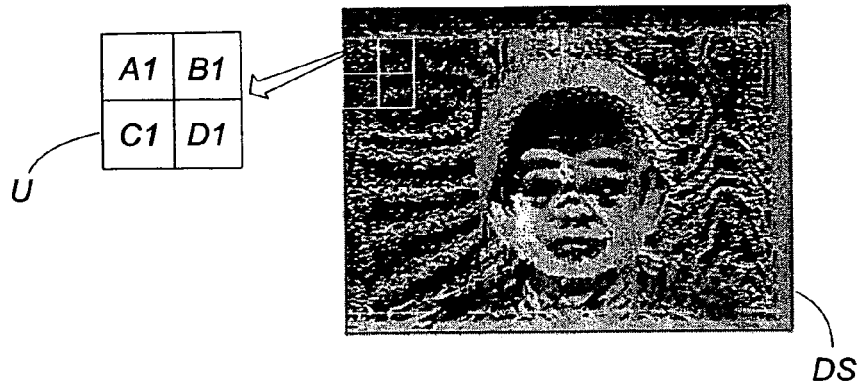
FIG. 26 illustrates the directional subject image [DS] derived from the subject image [S] of FIG. 24.
Figure 27:
FIG. 27 illustrates a reduced directional subject image [DS] compressed from the image of FIG. 26.

For example, when one of the pixels "a1", "b1", "c1", and "d1", say "b1" has a maximum of the differentiation strength and is designated as the representing pixel, as shown in FIG. 25, the compression module refers to a corresponding group of pixels "A1", "B1", "C1", and "C1", as shown in FIG. 26, and selects the density gradient directional value given to the pixel "B1" corresponding to the representing pixel in the group G to assign the selected directional value to the single sub-pixel [P] in the reduced image [Ds] of FIG. 27. Although the figures illustrate the data compression with regard to the subject image or the direction subject image [DS], the image size template [T] and its directional template image [DT] are processed in the same manner to provide the reduced directional template image.

Figure 28A:
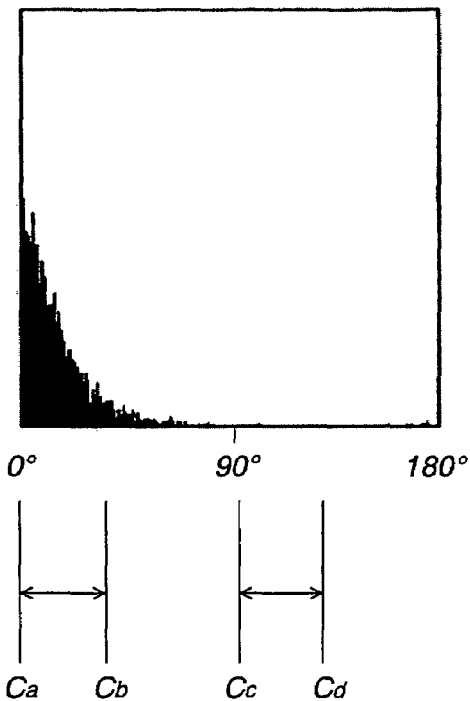
FIGS. 28A and 28B are histograms for the frequency distribution with regard to a direction difference utilized for verification of the mask area [M]
Figure 28B:
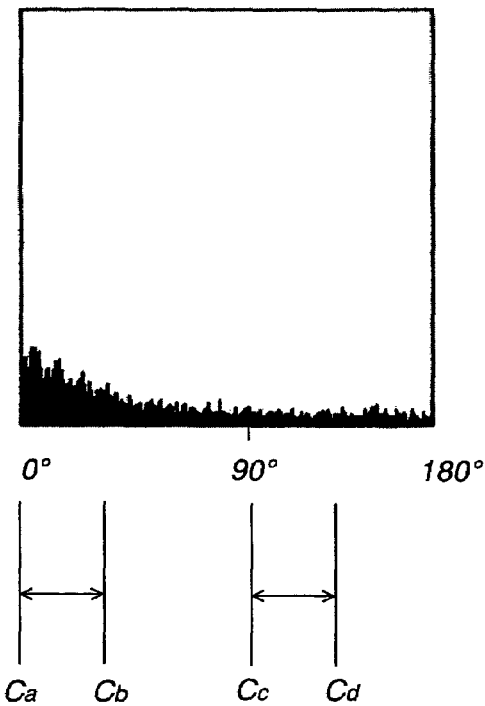

Now discussion is made to the verification unit 100 which verifies that the subject image confined by the mask area [M] is in match with the verification template [V]. As shown in FIG. 1, the verification unit 100 includes a directional image converter 110, and a differentiator 120. The converter 110 is configured to convert the verification template [V] into a density gradient directional verification template [DV] having an array of pixels each storing a density gradient directional value ($\theta V$). The differentiator 120 obtains a direction difference ($d\theta = \theta s - \theta v$) of the density gradient directions between each pixel of the mask area [M] of the directional subject image (DS) and a corresponding pixel of density gradient directional verification template (DV). Also included in the verification unit 100 is a class provider 130 which is configured to provide a predetermined number of different classes classified according to the direction difference, and to give a frequency distribution of the direction difference ($d\theta = \theta s - \theta v$), as shown in FIGS. 28A and 28B. An analyzer 140 is included to specify a restricted set of classes and count the sum of the frequency values for the specified classes for giving an evaluation parameter that is a function of the sum. In this instance, the analyzer 140 specifies the restricted set of the classes Ca-Cb covering a range of smaller directional difference ($d\theta = \theta s - \theta v$), for example, 0° to 42°, and defines the evaluation parameter to be a ratio of the sum of the frequency values to a total number of the pixels in the verification template [DV]. Based upon the evaluation parameter, i.e., the ratio (k1), a judge 150 verifies that the mask area [M] within the directional subject image [DS] is identical to the verification image template [DV] when the ratio (k1) exceeds a predetermined threshold, thereby issuing a verification-confirmed signal. Otherwise, the judge 150 issues a verification-failed signal.

When the mask area [M] is identical to the verification image template [DV], the frequency distribution of the direction difference ($d\theta = \theta s - \theta v$) is obtained as shown in a histogram of FIG. 28A. While on the other hand, when the mask area [M] is not identical to the verification image template [DV], i.e., shows a face of another person, the resulting frequency distribution is obtained as shown in a histogram of FIG. 28B which sees less frequency values, particularly in the classes Ca-Cb covering the smaller directional differences. Therefore, the judge 150 can successfully verify the mask area [M] by use of a suitably selected threshold.

Further, in view of the fact that the histogram of FIG. 28A sees less frequency values in another restricted set of classes Cc-Cd covering the greater directional differences, for example, 94° to 134° than that of FIG. 28B, the judge 150 may be configured to extract the frequency values for the classes Cc-Cd to obtain a ratio (k2) of the sum of the frequency values counted for the classes to the total number of the pixels, and to make the verification based upon the ratio, i.e., verify the identification of the mask area [M] when the ratio (k2) is smaller than another predetermined threshold. This judgment can be relied upon instead of or in addition to using the ratio (k1).

Moreover, the verification unit 100 includes a pixel filter 112 which is configured to obtain an x-axis derivative (dx) as well as a y-axis derivative (dy) with regard to the density for each pixel in at least one of the verification template [V] and the subject image [S] defined by the mask area [M]. Then, the pixel filter 112 specifies the pixel as a specific pixel when both of the x-axis derivative and y-axis derivative are zero for that pixel so that the differentiator 120 ignores the specific pixel in the mask area [M] of the directional subject image [DS] and the corresponding pixel in the directional verification template [DV] and not to give the direction difference (dθ=θs−θv) in relation to the specific pixel. Thus, it is made to distinguish the case where the directional difference is truly zero as a result of θs=θv from an exceptional case where dx and dy are zero which indicates no density gradient and results in θs=0 and θv=0 by the equation θV,θS=tan$^{-1}$(dy/dx). Accordingly, the inclusion of the pixel filter 112 ensures a more reliable verification.

Still further, the verification unit 100 includes a brightness filter 114 which is configured to get a brightness value assigned to each pixel of the subject image [S] confined by the mask area [M]. The filter 114 selects each pixel as a center pixel as well as neighboring pixels immediately adjacent thereto, obtains the brightness value for each of the selected pixels, and specifies the center pixel as a specific pixel when one or more of the selected pixels has a maximum of the brightness value. In this instance, eight (8) surrounding pixels are selected around the center pixel. Thus, when one or more of the selected pixels are given saturated brightness, the center pixel is judged not to be reliable for giving the density gradient direction (θv) or the directional difference (dθ=θs−θv), and is thereby ignored at the differentiator 120. That is, the differentiator 120 ignores the pixel in the directional subject image [DS] coincident with the specific pixel as well as the corresponding pixel in the directional verification template [DV] so as not to give the direction difference (dθ=θs−θv) in relation to the specific pixel.

The analyzer 140 may be alternatively configured to analyze the frequency distribution in order to give an approximation function thereof, and extract a constant term as an evaluation parameter from the approximation function. The frequency distribution is firstly normalized by assigning a normalized frequency of 1.00 to class of 0°, as shown in Table below:

| Class (°) | Frequency Value | Normalized Frequency |
|---|---|---|
| 0 | 150 | 1.00 |
| 1 | 125 | 0.83 |
| 2 | 107 | 0.71 |
| 3 | 94 | 0.63 |
| 4 | 83 | 0.56 |
| 5 | 75 | 0.50 |
| 6 | 65 | 0.45 |
| 7 | 63 | 0.42 |
| 8 | 58 | 0.38 |
| 9 | 54 | 0.36 |
| 10 | 50 | 0.33 |
| . | . | . |
| . | . | . |
| . | . | . |
| 170 | 6 | 0.03 |
| 171 | 6 | 0.03 |
| 172 | 5 | 0.03 |
| 173 | 5 | 0.03 |
| 174 | 5 | 0.03 |
| 175 | 4 | 0.03 |
| 176 | 4 | 0.03 |
| 177 | 3 | 0.03 |
| 178 | 3 | 0.03 |
| 179 | 2 | 0.03 |
| 180 | 2 | 0.03 |

Based upon the normalized frequency, the analyzer 140 gives the approximate function expressed by the following equation (11), $$y = 1 \times B^{-x} \tag{11}$$

in which y denotes the normalized frequency, (x) is a class value, and (B) is a constant term.

Figure 29A:
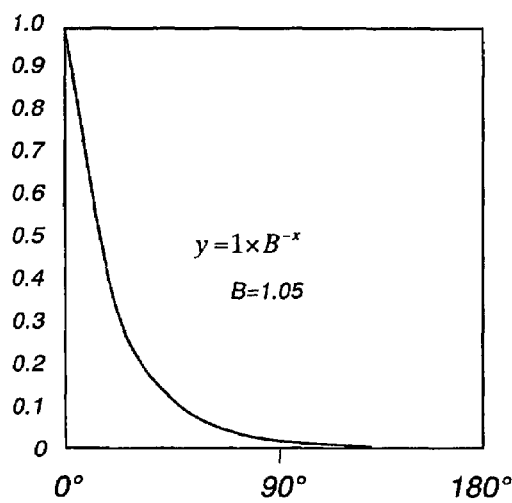
FIGS. 29A and 29B are graphs illustrating an approximation function for the frequency distribution with regard to a direction difference utilized for verification of the mask area [M]
Figure 29B:
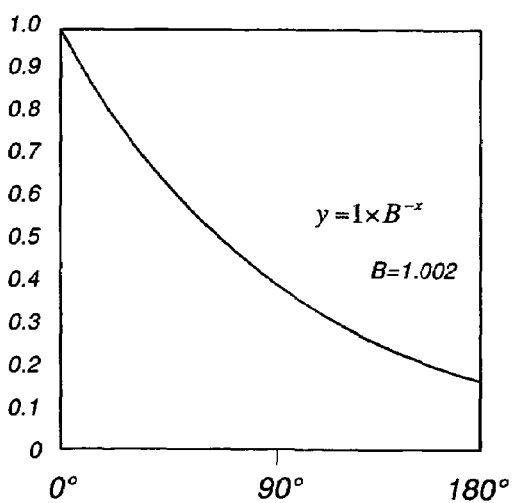

The analyzer 140 extracts the constant term (B) as an evaluation parameter such that the judge 150 verifies that the mask area [M] within the subject image [S] is identical to the verification image template [V] when the constant term (B) is greater than a predetermined threshold. For instance, when the frequency distribution of FIG. 28A, which indicates that the mask area is identical to the verification template [V], the above normalization gives the resulting approximate function curve of FIG. 29A and the resulting approximation function gives the constant term (B)=1.05. While on the other hand, when the frequency distribution of FIG. 28B, which indicates that the mask area [M] is not identical to the verification template, the above normalization gives the resulting approximation function curve of FIG. 29B and the resulting approximation function gives the constant term (B)=1.002. Accordingly, the judge 150 can successfully verify the mask area by using the threshold of 1.03, for example.

It is equally possible that the analyzer 140 may give an approximate function without normalizing the frequency distribution. In this instance, the approximate function can be expressed by the following equation (12), $$y = A \times B^{-x} \tag{12}$$

in which y denotes the frequency value, (A) is a coefficient, (x) is a class value, and (B) is a constant term.

Since constant term (B) is independent from coefficient (A), the verification can be made by comparing the constant term with a suitable threshold.

Further, the analyzer 140 may utilize the normalized frequency distribution and rely upon another approximate function as expressed by the following equation (13)

$$y = A \cdot \frac{-D}{x - D} \tag{13}$$

in which (y) denotes the normalized frequency, (A) is a coefficient, (x) is a class value, and (D) is a constant term.

Figure 30A:
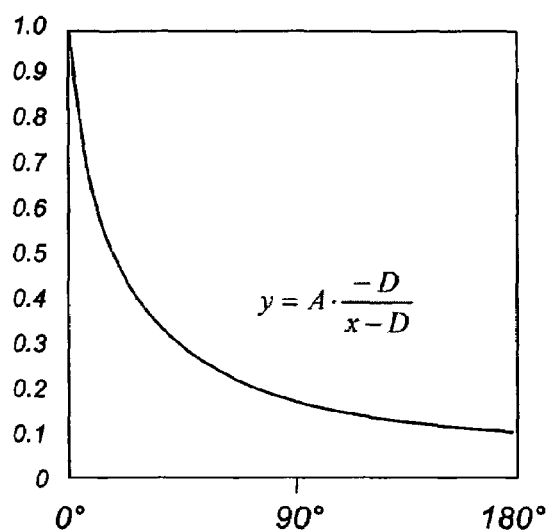
FIGS. 30A and 30B are graphs illustrating another approximation function for the frequency distribution with regard to a direction difference utilized for verification of the mask area [M]
Figure 30B:
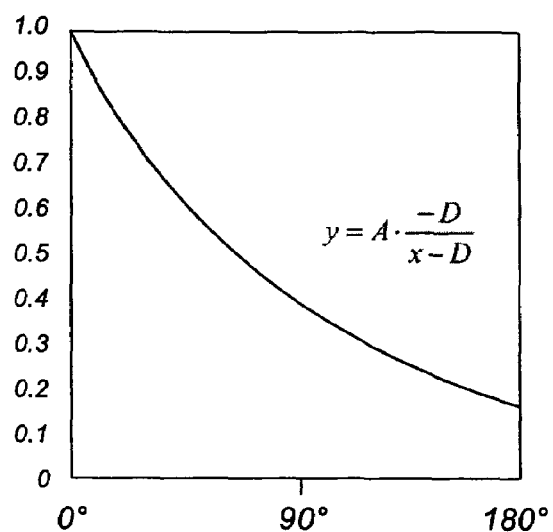

FIG. 30A illustrates the resulting approximate function curve for the frequency distribution of FIG. 28A, while FIG. 30B illustrates the resulting approximate function curve for the frequency distribution of FIG. 28B. The constant term (D) is found to be well discriminative of the normalized frequency distribution of FIG. 30A from that of FIG. 30B, and can be relied upon for the verification.

Figure 31:
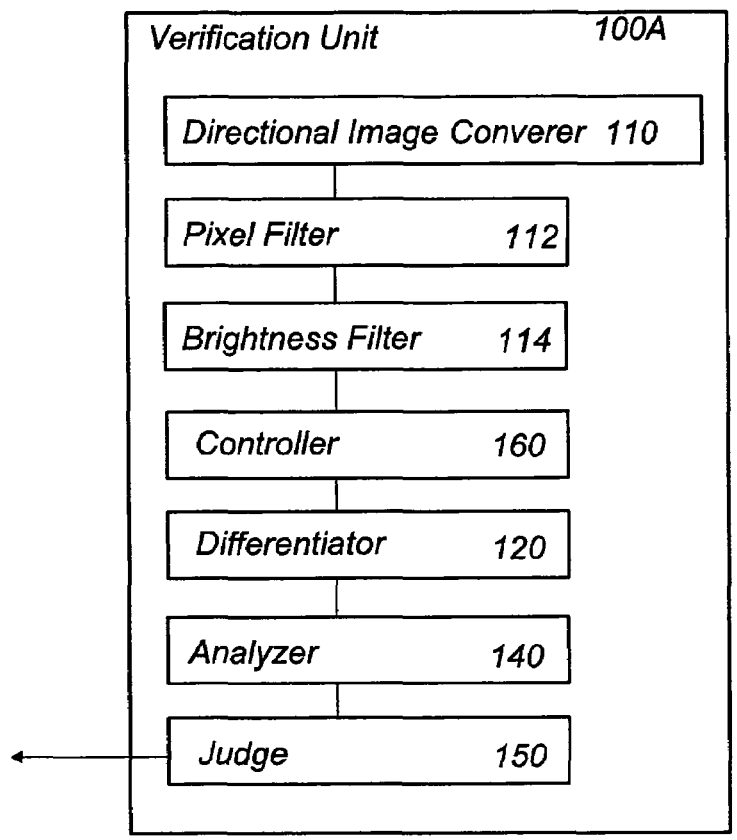
FIG. 31 illustrates a modified verification unit utilized in the above system.
Figure 32:
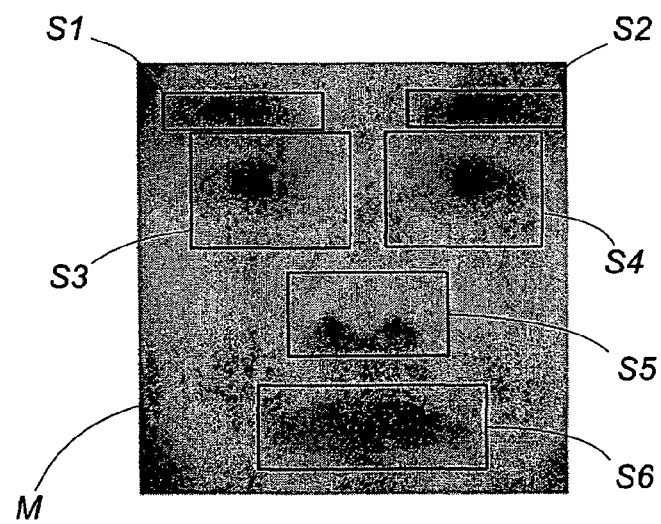
FIG. 32 illustrates a masked subject image [S] divided into sub-divisions.

Referring to FIG. 31, there is illustrated a modified verification unit 100A which additionally includes a controller 160 for improving verification efficiency on a basis of that the human face has more than one distinctive parts, such as eyes, eyebrows, nose, and mouth which are included in the mask area [M] of the subject image, as shown in FIG. 32. The controller 160 is configured to select one of sub-divisions S1 to S6 each included in the mask area [M] to cover the distinctive part, and to limit the mask area [M] temporarily to the selected sub-division so as to call for the judge 150, i.e., instruct the judge to make the verification with regard to the selected sub-division. The controller 160 is therefore linked with the differentiator 120 and the analyzer 140, in addition to the judge 150, for verification of the selected sub-division. The controller 160 is configured to make the verification of the individual sub-divisions in sequence until any one of the sub-divisions is verified to be identical to that of the verification template or until all of the sub-divisions are analyzed, whichever comes first. Accordingly, upon verification of any one of sub-divisions, the judge 150 issues the verification-confirmed signal. Otherwise, the judge issues the verification-failed signal.

Alternatively, the controller may be configured to limit the mask area [M] to the instantly selected sub-division plus all of the previously selected sub-divisions until the judge decides the verification or until all of the sub-divisions are selected. Thus, the verification can be based upon the cumulative sub-divisions for more reliable verification.

Figure 33:
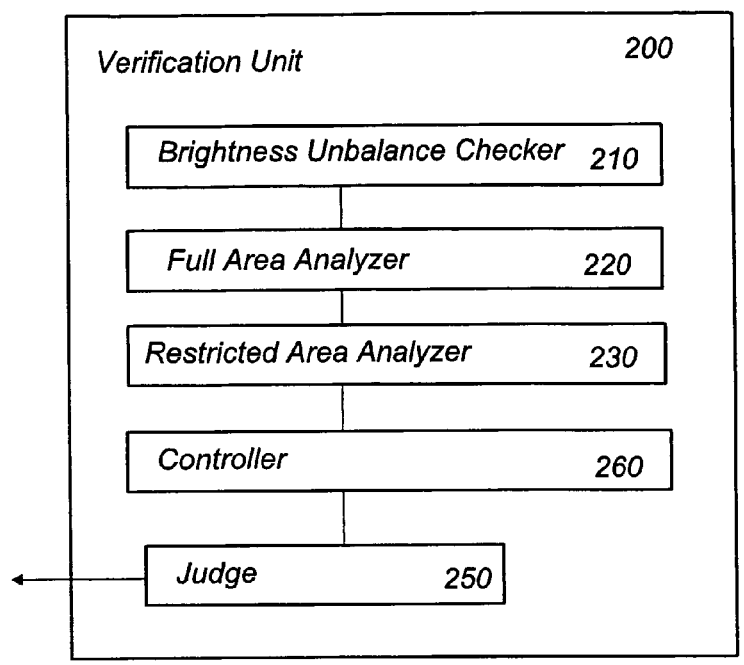
FIG. 33 illustrates a verification unit which may be utilized in the above system.
Figure 34:
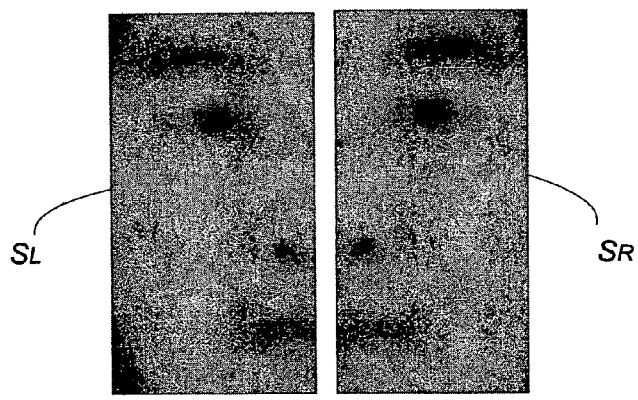
FIG. 34 illustrates the masked subject image [S] divided into two symmetrical sub-regions for checking brightness unbalancing.

FIG. 33 illustrates a verification unit 200 which may be utilized in the above system, instead of the verification unit as explained in the above. The verification unit 200 is specifically contemplated to give a reliable verification result in well compensation for uneven brightness or density distribution possibly seen in the subject image [S]. That is, the verification unit 200 acknowledges first whether there is a considerable brightness unbalancing in the subject image [S] confined by the mask area [M], and decides which part or parts of the mask area has to be relied upon for the verification. For this purpose, the verification unit 200 includes a brightness unbalance checker 210 which is configured to divide the mask area [M] into two sub-divisions and obtain a brightness index indicative of a mean value or a variance with regard to the density for all the pixels in each of the sub-divisions. The unbalance checker 210 provides an unbalancing degree which is a function of thus obtained two brightness indexes and which becomes less as the two brightness indexes are closer to each other. For instance, the mask area [M] is divided into two symmetrical sub-divisions SL and SR, as shown in FIG. 34 to obtain the brightness index for each of the sub-divisions, and therefore the resulting unbalancing degree. One example for the function is a difference or ratio between the brightness indexes obtained for the individual sub-regions.

A controller 260 is included in the verification unit 200 to select one of two analyses depending upon the unbalancing degree, one using a full-area analyzer 220 for analyzing the entire mask area [M], and the other using a restricted-area analyzer 230 for analyzing a restricted part within the mask area [M]. When the unbalancing degree exceeds a predetermined unbalance threshold (UT1), i.e., there is a considerable brightness unbalancing, the controller 260 relies upon the restricted-area analyzer 230, and otherwise relies upon the full-area analyzer 220.

The full-area analyzer 220 is configured to compare the subject image confined by the mask area [M] with the verification image template [V] with regard to the density so as to give a first correlation coefficient, and provide a full-verification-confirmed signal when the first correlation coefficient exceeds a predetermined first correlation threshold (CT1) and otherwise provide a full-verification-failed signal. While, the restricted-area analyzer 230 is configured to compare each one of the sub-regions with a corresponding part of the verification image template [V] so as to give a second correlation coefficient, thereby providing a restricted-verification-confirmed signal when the second correlation coefficient exceeds a predetermined second correlation threshold (CT2) and otherwise providing a restricted-verification-failed signal. Based upon the above two analyses, a judge 250 provides a consistent verification result, as will be explained with reference to a flow chart of FIG. 35.

Figure 35:
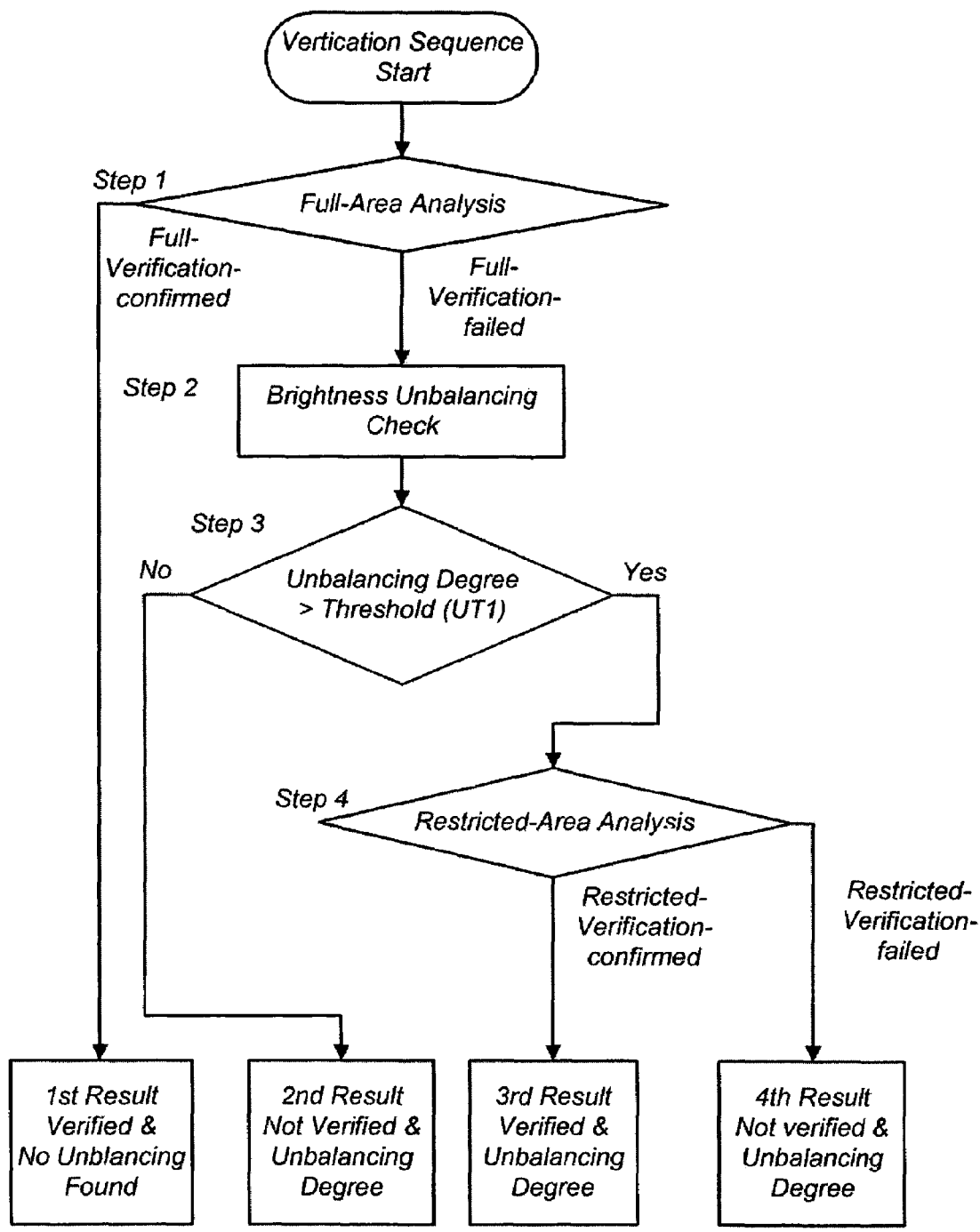
FIG. 35 is a flow chart illustrating a verification sequence made at the verification unit of FIG. 33.

As shown in FIG. 35, the controller 260 activates the full-area analyzer 220 first to make the full-area analysis to see which one of the full-verification-confirmed signal and the full-verification-failed signal is issued <step 1>. Upon seeing the full-verification-confirmed signal, the controller 260 instructs the judge 250 to provide a first result that the masked subject image is verified. Otherwise, the controller 260 activates the brightness unbalancing checker 210 to make the unbalancing check <step 2>, and sees whether or not the unbalancing degree exceeds the predetermined unbalance threshold (UT1) <step 3>. When the unbalancing degree is not more than the unbalance threshold (UT1), the controller 260 instructs the judge 250 to provide a second result that the subject image is not verified and there is no substantial brightness unbalancing. While on the other hand, when the unbalancing degree exceeds the unbalance threshold (UT1), the controller 260 activates the restricted-area analyzer 230 to make the restricted-area analysis <step 4>. In this analysis, the restricted-verification-confirmed signal is obtained when any one of the sub-regions gives the second correlation coefficient exceeding the second threshold (T2). Otherwise, the restricted-verification-failed signal is obtained. This analysis is advantageous for reducing a possibility that the subject image [S] might be rejected as not being verified although it is to be verified or authenticated to be identical to the verification image template [V]. In response to the restricted-verification-confirmed signal, the controller 260, instructs the judge 250 to issue a third result that the masked subject image is verified and there is a considerable brightness unbalancing. The controller 260, in response to the restricted-verification-failed signal, instructs the judge 250 to issue a fourth result that the masked image is not verified and that there is a considerable brightness unbalancing. The controller 260 may be arranged to add information of unbalancing degree to the corresponding results.

In view of that the correlation coefficient will become less as the unbalancing degrees increases, it is preferred that the second correlation threshold (CT2) is smaller than the first threshold (CT1) for reliable verification even in the presence of the unbalanced brightness. Further, the second correlation threshold (CT2) may be lowered continuously or stepwise as the unbalancing degree increases for more consistent verification.

Further, the controller 260 may be configured to make the brightness unbalancing check even when the full-verification-confirmed signal is issued in order to add the information of the unbalancing degree to the first result.

Figure 36:
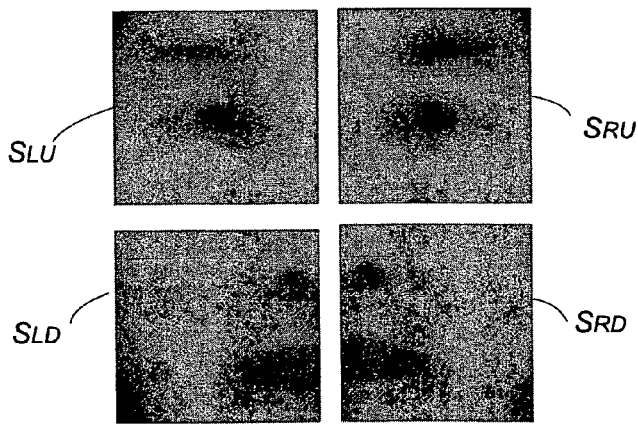
FIG. 36 illustrates the masked subject image [S] divided into four symmetrical sub-regions for checking brightness unbalancing.

Although the above restricted-area analysis is explained to give the restricted-verification-confirmed signal when any one of the sub-regions satisfies that the second correlation coefficient exceeds the second correlation threshold (CT2), it is equally possible to rely upon an authentic ratio of the number of authentic region to the total number of the sub-regions. That is, the restricted-area analyzer may be devised to obtain the second correlation coefficient for each of the sub-regions, and designate the sub-region as the authentic region when the second correlation coefficient exceeds the second correlation threshold (CT2), thereby giving the authentic ratio. With this scheme relying upon the authentic ratio, it is possible to give consistent verification when the mask area [M] is divided into more than two sub-regions as shown in FIG. 36. In this instance, each of the symmetrical sub-regions SLU, SLD, SRU, and SRD is examined also by the brightness unbalancing checker 210 to give the unbalancing degree which is a function of the four (4) brightness indexes obtained respectively for the sub-regions, or a function of the maximum and minimum ones of the brightness indexes.

Figure 37:
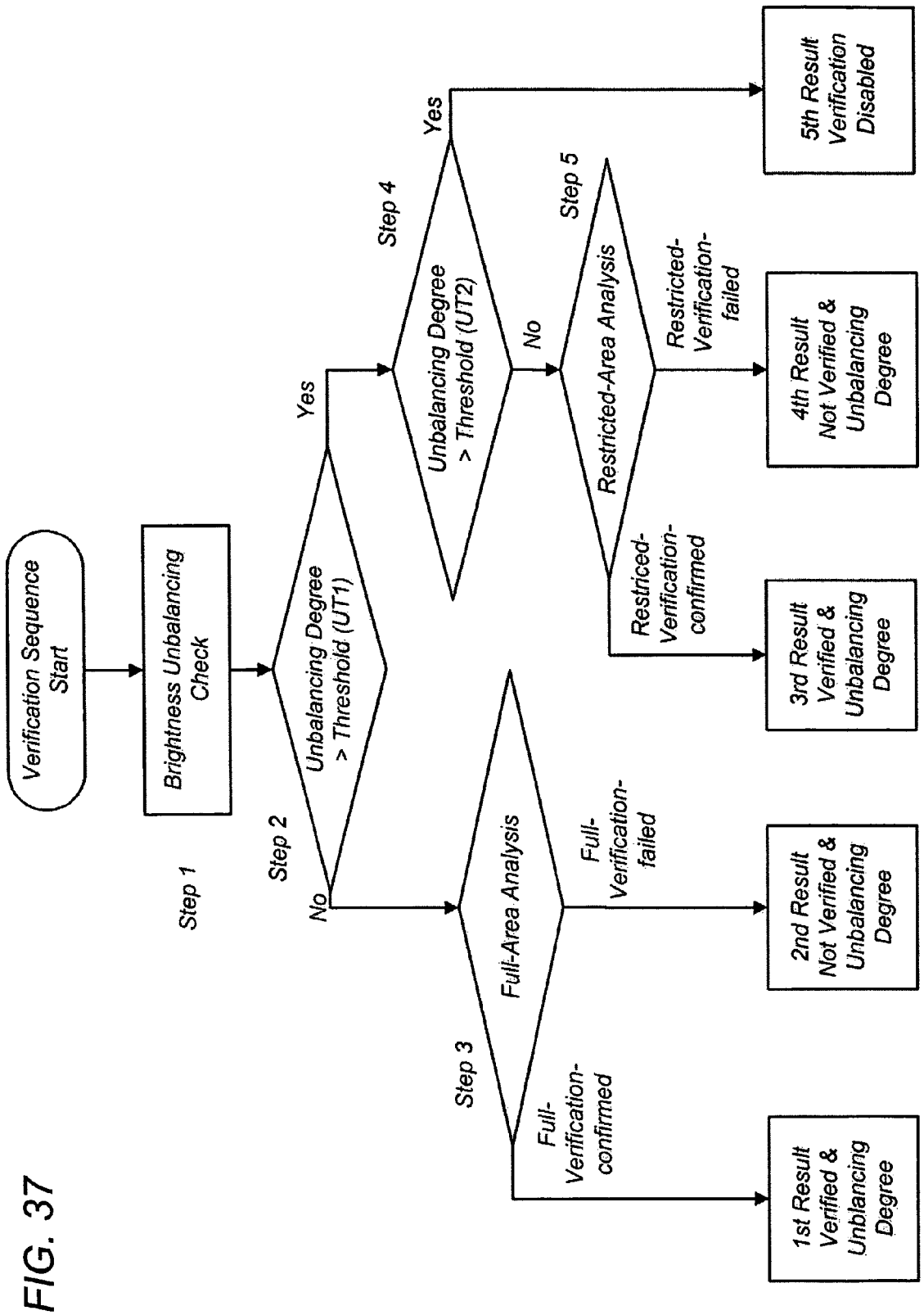
FIG. 37 is a flow chart illustrating another verification sequence which may be carried out at the above verification unit.

Referring to FIG. 37, there is shown another verification sequence which may be equally effective for the verification unit 200. In this instance, the controller 260 activates the brightness unbalancing checker 210 first to obtain the unbalancing degree <step 1>, to decide which one of the full-area analysis and the restricted-area analysis is made depending upon the unbalancing degree. When the unbalancing degree is found at step 2 to be not more than the first unbalance threshold (UT1), the controller activates the full-area analyzer 220. Otherwise it is again checked whether the unbalancing degree exceeds a second unbalance threshold (UT2) greater than the first unbalance threshold (UT1) <step 4>.

When the full-area analysis issues in the full-verification-confirmed signal at step 3, the controller 260 instructs the judge 250 to issue the first result that the subject image is verified. When the full-verification-failed signal is issued at the full-area analysis at step 3, the judge 250 responds to provide a second result that the subject image is not verified.

When the unbalancing degree is found at step 4 to be not more than the second threshold (UT2), the restricted-area analysis is relied upon at step 5 to issue a restricted-verification-confirmed signal or the restricted-verification-failed signal. In response to these signals, the judge 250 provides a third result that the subject image is verified and a fourth result that the subject image is not verified, respectively. When the unbalancing degree exceeds the second unbalance threshold (UT2), the judge responds to provide a fifth result that the verification is disabled. Each of the results is accompanied with the information of the unbalancing degree for easy confirmation of the condition of the subject image.

Although the above full-area analyzers 220 and the restricted analyzer 230 are explained to examine the correlation of the masked subject image [S] and the verification template [V] with regard to the density thereof, it is equally possible for each of the analyzers to examine the correlation of the masked subject image and the verification image with regard to their density gradient directional values as discussed with reference to the verification unit 100.

Further, it should be noted that the individual features disclosed with reference to FIGS. 28 to 37 can be advantageous for verification of the subject image independently of the mask locating scheme as explained with reference to FIGS. 1 to 27, and therefore can be made as a basis for independent subject matter.

The invention claimed is:

1. An object recognition system comprising
a template memory configured to store an image size template (T);
an image reader configured to take a subject image (S) to be recognized;
a mask locator configured to locate a mask area (M) from within said subject image, said mask area (M) corresponding to said image size template (T), and
wherein said mask locator comprising:
an image converter configured to convert said image size template (T) as well as said subject image (S) respectively into a density gradient directional template image (DT) and a density gradient directional subject image (DS), each of said directional images having an array of pixels each storing a density gradient directional value ($\theta T$, $\theta S$) assigned thereto;
a feature analyzer configured to select a plurality of reference points (R0, . . . Rn) around a predetermined center point (C$_T$) within said directional template image (DT) and to obtain a distance (L) and an angle ($\alpha$) for each of said reference points, said distance (L) being a length of a line extending from said center point to said reference point, and said angle ($\alpha$) being an angle of said line with respect to a horizontal axis;
a table configured to store, for each of said reference points, said distance (L) and angle ($\alpha$) in association with said density gradient directional value ($\theta T$) given to each of said reference points (R0, . . . Rn);
a vote module configured to:
obtain said density gradient directional value ($\theta S$) for each pixel of said directional subject image (DS),
read from said table parameters composed of the distance (L), the angle ($\alpha$), and coordinates with regard to the reference points having the same density gradient directional value ($\theta T = \theta S$), so as to calculate a plurality of candidates for a center of said mask area (M) based upon these parameters and to make a vote on each of said candidates;
a detection module configured to designate at least one of said candidates as the center of said mask area (M) according to the number of said votes, thereby determining said mask area (M) around thus designated center within said subject image.

2. The system as set forth in claim 1, wherein said image size template includes a human face so that the system recognizes the human face.

3. The system as set forth in claim 1, wherein said detection module is configured to obtain a maximum of said vote and designate one of said candidates having a maximum number of votes as the center of said mask area (M), thereby determining said mask area (M) around thus designated center within said subject image.

4. The system as set forth in claim 3, wherein
said vote module is further configured to vary said distance (L) within a predetermined range in order to calculate a plurality of said candidates for each of the varied distances, and to make a vote on each of said candidates, and
said detection module is further configured to extract the varied distance from the candidate having a maximum number of said votes, thereby obtaining a size of the mask area (M) relative to said image size template (T).

5. The system as set forth in claim 3, wherein
said mask locator includes a multiplier which varies a size of said image size template within a predetermined range such that said vote module calculates a plurality of said candidates for each of the varied sizes and make a vote on each of said candidates, and
said detection module is further configured to extract the varied size from the candidate having a maximum number of said votes, thereby obtaining a size of the mask area (M) relative to said image size template [T].

6. The system as set forth in claim 3, wherein
said vote module is further configured to vary said angle ($\alpha$) within a predetermined range in order to calculate a plurality of said candidates for each of said varied angles ($\alpha + \phi$), and make a vote on each of said candidates, said detection module is further configured to extract the varied angle (α+φ) from the candidate having a maximum number of said votes, thereby obtaining a rotation angle (φ) of the mask area (M) relative to said image size template.

7. The system as set forth in claim 3, wherein
said mask locator includes a rotator which rotates said image size template by a varying angle (φ) within a predetermined range such that said vote module calculates a plurality of said candidates for each of the varied angles and make a vote on each of said candidates,
said detection module is further configured to extract the angle (φ) from the candidate having a maximum number of said votes, thereby obtaining a rotation angle (φ) of the mask area (M) relative to said image size template.

8. The system as set forth in claim 3, wherein said vote module is configured to make a preliminary voting and subsequently a master voting,
said preliminary vote is made with said distance (L) varying by a rough step over a wide range, while said master vote is made with said distance (L) varying by a precise step over a restricted range relative to said preliminary voting,
said detector module comprises:
a preliminary detector configured to instruct said vote module to firstly make the preliminary voting, obtain a prime distance (k(max))) defined by the candidate having the maximum number of votes, and select two adjacent peripheral distances on opposite sides of the prime distance,
a master detector configured to instruct said vote module to make the master voting only within said restricted range between the selected peripheral distances for obtaining the number of votes for each of the distances varied by said precise step,
a curve generator configured to render an approximation curve for the number of votes given by said master voting with regard to said varied distances;
an estimator configured to give an estimated distance corresponding to a maximum of said approximation curve; and
a template adjustor configured to determine a relative size of the mask area (M) to said image size template by using said estimated distance.

9. The system as set forth in claim 3, wherein said vote module is configured to make a preliminary voting and subsequently a master voting,
said preliminary vote is made with said angle (α) varying by a rough step over a wide range, while said master vote is made with said angle (α) varying by a precise step over a restricted range relative to said preliminary voting,
said detector module comprises:
a preliminary detector configured to instruct said vote module to firstly make the preliminary voting, obtain a prime angle (Max(φ)) defined by the candidate having the maximum number of votes, and select two adjacent peripheral angles on opposite sides of the prime angle,
a master detector configured to instruct said vote module to make the master voting only within the restricted range between said peripheral angles for obtaining the number of votes for each of the angles varied by said precise step;
a curve generator configured to render an approximation curve for the number of votes given by said master voting with regard to said varied angles;
an estimator configured to give an estimated angle (φ) corresponding to a maximum of said approximation curve; and a template adjustor configured to determine a rotation angle of said mask area (M) relative to said image size template as said estimated angle.

10. The system as set forth in claim 1, wherein said detection module comprises:
a selector configured to select said candidates having the number of votes exceeding a predetermined vote threshold;
a mask provider configured to set said mask area (M) around the center defined by each of selected candidates;
a duplication checker configured to obtain, if more than one mask area (M) is set and if the mask areas overlap partially with each other, the number of votes for each of said overlapped mask areas and designate only one of said overlapped mask areas having the maximum number of votes as a representing mask area (M).

11. The system as set forth in claim 1, wherein said detection module comprises:
a selector configured to select said candidates having the number of votes exceeding a predetermined vote threshold;
a mask provider configured to set said mask area (M) around the center defined by each of selected candidates;
a background noise filter configured to obtain a parameter indicative of the number of said votes given to each of said pixels selected around said candidate for said mask area (M), and filter out the mask area (M) having said parameter exceeding a predetermined parameter threshold.

12. The system as set forth in claim 1, wherein
said detection module comprises:
a selector configured to select said candidates having the number of votes exceeding a predetermined vote threshold;
a mask provider configured to set said mask area (M) around the center defined by each of selected candidates;
a background noise filter having a standard distribution of density gradient directional values predefined for a standard object, said background noise filter being configured to give a subject distribution of said density gradient directional values obtained for said subject image (S) within said mask area (M), and analyze said subject distribution in comparison with said standard distribution statistically in order to validate said mask area (M) and filter out the mask area (M) not validated.

13. The system as set forth in claim 1, wherein said detection module comprises:
a selector configured to select said candidates having the number of votes exceeding a predetermined vote threshold;
a mask provider configured to set said mask area (M) around the center defined by each of selected candidates;
a background noise filter configured to give a frequency distribution of said density gradient directional values with regard to the pixels in said mask area (M), obtain therefrom a variance for that mask area (M), and filter out the mask area (M) having the variance exceeding a predetermined variance threshold.

14. The system as set forth in claim 1, wherein said detection module comprises:
a selector configured to select said candidates having the number of votes exceeding a predetermined vote threshold;
a mask provider configured to give said mask area (M) around the center defined by each of selected candidates;
a background noise filter configured to give a frequency distribution of said density gradient directional values with regard to the pixels in said mask area (M), obtain a maximum cyclicity for said mask area (M), filter out the mask area (M) having the maximum cyclicity exceeding a predetermined cyclicity threshold.

15. The system as set forth in claim 1, wherein
said image converter is configured to provide said density-gradient directional template image and said density-gradient directional subject image, as well as a reduced directional template image and a reduced directional subject image both of which are reduced in the number of pixels respectively than said directional template image and said directional subject image such that such that a unit zone composed of two or more adjacent pixels in each of said directional template image and said directional subject image is integrated into a single sub-pixel in each of said reduced template image and said reduced subject image;
said image converter including a compression module which obtains an x-axis derivative (dx) as well as a y-axis derivative (dy) with regard to the density for each pixel in each of said image size template and said subject image, and obtains a differentiation strength (dxy) determined by the following equation:

$$dxy = \frac{(dx+dy)}{2}$$

said compression module providing an edge image having an array of pixels each assigned to said differentiation strength, and selecting within said array a group of the pixels as corresponding to said unit zone in order to find one of the pixel in said group which has a maximum of said differential strength and designate said one pixel as a representative pixel,
said compression module referring to each of said directional template image and said directional subject image in order to select the density gradient directional values respectively given to the pixels which correspond to said representative pixel in said edge image, and allocating thus selected density gradient directional value to said single sub-pixel in each of said reduced directional template image and said reduced directional subject image, said reduced directional template image and said reduced directional subject image being stored in a memory to be processed by said feature analyzer and said vote module.

16. The system as set forth in claim 1, wherein said template memory is configured to store a verification image template, and said system further includes:
a verification unit which is configured to compare said mask area (M) with said verification image template (V) in order to provide a verification result indicative of whether or not the mask area (M) is in match with the verification image template (V).

17. The system as set forth in claim 16, wherein said verification unit comprises:
a directional image converter configured to convert said verification image template (V) into a corresponding density gradient directional verification template (DV), said directional verification image template (DV) having an array of pixels each storing a density gradient directional value (θV) assigned thereto;
a differentiator configured to give a direction difference (dθ=θs−θv) of the density gradient directions between each pixel of said mask area (M) of the directional subject image (DS) and a corresponding pixel of said density gradient directional verification template (DV);
a class provider configured to provide a predetermined number of different classes classified according to said direction difference, and to give a frequency distribution of said direction differences (dθ=θs−θv);
an analyzer configured to specify a restricted set of said classes and count the sum of frequency values for the specified classes, and give an evaluation parameter that is a function of said sum, and
a judge configured to verify that said subject image is identical to said verification image template when said evaluation parameter satisfies a predetermined criterion.

18. The system as set forth in claim 17, wherein said analyzer gives said evaluation parameter which is a ratio of the sum of said frequency value to a total number of said pixels in either of said verification template [V] or said mask area (M).

19. The system as set forth in claim 17, wherein
said verification unit further includes a pixel filter configured to obtain an x-axis derivative (dx) as well as a y-axis derivative (dy) with regard to the density for each pixel in at least one of said verification template (V) and said subject image (S) confined by said mask area (M), said pixel filter specifying the pixel as a specific pixel when both of the x-axis derivative and y-axis derivative are zero for that pixel,
said differentiator being configured to ignore said specific pixel in said mask area (M) of the directional subject image and the corresponding pixel in the directional verification template and not to give the direction difference (dθ=θs−θv) in relation to said specific pixel.

20. The system as set forth in claim 17, wherein said verification unit further includes
a brightness filter which is configured to get a brightness value assigned to each pixel of said subject image confined by said mask area (M);
said brightness filter selecting each pixel as a center pixel and neighboring pixels immediately adjacent thereto, and obtaining the brightness value for each of the selected pixels, said brightness filter specifying said center pixel as a specific pixel when one or more of the selected pixel has a maximum of said brightness value,
said differentiator being configured to ignore the pixel in said directional subject image coincident with said specific pixel as well as the corresponding pixel in the directional verification template and not to give the direction difference (dθ=θs−θv) in relation to said specific pixel.

21. The system as set forth in claim 16, wherein said verification unit comprises:
a directional image converter configured to convert said verification image template (V) into a corresponding density gradient directional verification template (DV), said directional verification template (DV) having an array of pixels each storing a value indicative of a density gradient directional value (θV) assigned thereto;
a differentiator configured to give a direction difference (dθ=θs−θv) of the density gradient directions between each pixel of said mask area (M) of the directional subject image (DS) and a corresponding pixel of said density gradient directional verification template (DV);
a class provider configured to provide a predetermined number of different classes classified according to said direction difference, and to give a frequency distribution of said direction differences (dθ=θs−θv);

an analyzer configured to analyze said frequency distribution to give an approximation function thereof, said analyzer extracting a constant term as an evaluation parameter from said approximation function, and a judge configured to verify said subject image is identical to said verification image template when said evaluation parameter satisfies a predetermined criterion.

22. The system as set forth in claim 17 or 21, wherein said verification unit further includes a controller configured to select one of sub-divisions each included in the mask area (M) to cover a distinctive part of the subject image, to limit said mask area (M) to the selected sub-division, and to call for said judge, said controller selecting another of said sub-divisions and limiting said mask area (M) thereto until said judge decides the verification or until all of said sub-divisions are selected.

23. The system as set forth in claim 17 or 21, wherein said verification unit further includes a controller configured to select one of sub-divisions each included in the mask area (M) to cover a distinctive part of the subject image, to limit said mask area (M) to the selected sub-division, and to call for said judge, said controller selecting another of said sub-divisions and limiting said mask area (M) to said another sub-division plus all the previously selected sub-division until said judge decides the verification or until all of said sub-divisions are selected.

24. The system as set forth in claim 16, wherein said verification unit comprises:

a brightness unbalance checker configured to divide said mask area (M) into two symmetrical sub-regions (SL, SR) and to obtain a brightness index indicative of a mean value or a variance with regard to the density for all the pixels in each of said sub-regions, said unbalance checker giving an unbalancing degree which is a function of said two brightness indexes and becomes less as said two brightness indexes are closer to each other;

a full-area analyzer configured to compare the entire mask area (M) with said verification image template so as to give a first correlation coefficient, said full-area analyzer providing a full-verification-confirmed signal when said first correlation coefficient exceeds a predetermined first correlation threshold and otherwise provide a full-verification-failed signal;

a restricted-area analyzer configured to compare at least one of said sub-regions (SL, SR) with a corresponding part of said verification image template (V) so as to give a second correlation coefficient, said restricted-area analyzer providing a restricted-verification-confirmed signal when said second correlation coefficient exceeds a predetermined second correlation threshold and otherwise providing a restricted-verification-failed signal;

a controller configured to activate said full-area analyzer and activate said brightness unbalance checker only upon recognition of said full-verification-failed signal, said controller activating said restricted-area analyzer when said unbalancing degree exceeds a predetermined unbalance threshold, a judge configured to provide 1) a first result that the subject image is verified upon recognition of said full-verification-confirmed signal;

2) a second result that the subject image is not verified upon recognition of said full-verification-failed signal;

3) a third result that the subject image is verified upon recognition of said restricted-verification-confirmed signal;

4) a fourth result that the subject image is not verified upon recognition of said restricted-verification-failed signal.

25. The system as set forth in claim 16, wherein said verification unit comprises:

a brightness unbalance checker configured to divide said mask area (M) into two symmetrical sub-regions (SL, SR), obtain a brightness index indicative of a mean value or a variance with regard to the density for all the pixels in each of said sub-regions, said unbalance checker giving a unbalancing degree which is a function of said two brightness indexes to become less as said two brightness indexes are closer to each other;

a full-area analyzer configured to compare the entire mask area (M) with said verification image template to give a first correlation coefficient, and provide a full-verification-confirmed signal when said first correlation coefficient exceeds a predetermined first correlation threshold and otherwise provide a full-verification-failed signal;

a restricted-area analyzer configured to compare at least one of said sub-regions (SL, SR) with a corresponding part of said verification image template to give a second correlation coefficient, said restricted-area analyzer providing a restricted-verification-confirmed signal when said second correlation coefficient exceeds a predetermined second correlation threshold and otherwise providing a restricted-verification-failed signal;

a controller configured to activate said brightness unbalance checker, and activate said full-area analyzer when said unbalancing degree is less than a predetermined unbalance threshold and otherwise activate said restricted-area analyzer, a judge configured to provide 1) a first result that the subject image is verified upon recognition of said full-verification-confirmed signal;

2) a second result that the subject image is not verified upon recognition of said full-verification-failed signal;

3) a third result that the subject image is verified upon recognition of said restricted-verification-confirmed signal;

4) a fourth result that the subject image is not verified upon recognition of said restricted-verification-failed signal.

26. The system as set forth in claim 24 or 25, wherein said restricted-area analyzer (230) configured to select a plurality of said sub-regions within said mask area (M), and compare each sub-region with a corresponding part of said verification image template to give said second correlation coefficient for said each sub-region, said restricted-area analyzer defining said each sub-region as an authentic sub-region when said second correlation coefficient exceeds said second correlation threshold, said restricted-area analyzer providing said restricted-verification-confirmed signal when a ratio of the number of the authentic sub-region to that of said all sub-regions exceeds a predetermined threshold.

27. The system as set forth in claim 24 or 25, wherein said second correlation threshold is lower than said first correlation threshold.

28. The system as set forth in claim 24 or 25, wherein said restricted-area analyzer is disabled when said unbalancing degree exceeds a critical level.

29. The system as set forth in claim 24 or 25, wherein said judge is configured to output an unbalancing result including at least one of said unbalancing degree and whether or not said unbalancing degree is less than said unbalance threshold.

* * * * *